United States Patent
Arathorn

(10) Patent No.: US 6,397,201 B1
(45) Date of Patent: May 28, 2002

(54) E-CELL (EQUIVALENT CELL) AND THE BASIC CIRCUIT MODULES OF E-CIRCUITS: E-CELL PAIR TOTEM, THE BASIC MEMORY CIRCUIT AND ASSOCIATION EXTENSION

(76) Inventor: David W. Arathorn, 6068 Margarido, Oakland, CA (US) 94618

( * ) Notice: Subject to any disclaimer, the term of this patent is extended or adjusted under 35 U.S.C. 154(b) by 0 days.

(21) Appl. No.: 09/201,395

(22) Filed: Nov. 30, 1998

Related U.S. Application Data

(60) Provisional application No. 60/067,125, filed on Dec. 2, 1997.

(51) Int. Cl.$^7$ .................................................. G06N 3/06
(52) U.S. Cl. .............................. 706/33; 706/26; 706/33; 706/40; 706/42
(58) Field of Search .............................. 706/26, 33, 40, 706/41; 257/14; 708/801; 382/257

(56) References Cited

U.S. PATENT DOCUMENTS 4,774,677 A * 9/1988 Buckley ....................... 706/23
4,989,256 A * 1/1991 Buckley ....................... 706/41

(List continued on next page.)

OTHER PUBLICATIONS

Elias, J.G.; Chu, H.–H.; Meshreki, S.M., Silicon implementation of an artificial dendritic tree, Neural Networks, 1992. IJCNN., International Joint Conference on, vol. 1, 7–11 Jun. 1992, pp: 154–159 vol. 1, Jun. 1992.*

(List continued on next page.)

Primary Examiner—Kevin J. Teska
Assistant Examiner—Wilbert L. Starks, Jr.
(74) Attorney, Agent, or Firm—Fliesler Dubb Meyer & Lovejoy LLP

(57) ABSTRACT

The e-cell is a computational element for the construction of circuits capable of performing transform invariant pattern recognition, scene segmentation, and regularity extraction in a variety of sensory modes including vision, hearing, olefaction, touch, etc. The e-cell consists of a cell body, an output terminal, and set of tree-connected input regions each of which have one or more input terminals and corresponding stored weights. The e-cell is capable of learning and subsequently discriminating multidimensional (in the mathematical sense) activation patterns applied to its inputs. The strictness with which the e-cell requires the presence in the target of each dimension of a learned pattern is dynamically adjustable, thus making it suitable to recognition of learned patterns under occlusion and various kinds of degradation. The strictness of discrimination across the region dimension is independent of the strictness of recognition within each dimension. The e-cell can also be configured to perform non-memory roles such as contrast enhancement, pattern comparison, signal routing, and event timing.

The e-cell pair totem provides a circuit construction module of cortically inspired circuits for transform invariant pattern recognition and scene segmentation in a variety of sensory modes including vision, hearing, olefaction, touch, etc. The e-cell pair totem implements the forward and backward paths, feedback connections and consequent oscillatory dynamics characteristic of e-circuits. The basic totem circuit is specialized to create a basic memory circuit. The basic memory circuit is extended to allow contextual and associative information to influence recognition by the memory stage of the basic memory circuit.

10 Claims, 20 Drawing Sheets

U.S. PATENT DOCUMENTS

| | | | | |
|---|---|---|---|---|
| 5,004,932 A | | 4/1991 | Nejime | |
| 5,130,563 A | * | 7/1992 | Nabet et al. | 706/40 |
| 5,136,176 A | * | 8/1992 | Castro | 706/33 |
| 5,136,177 A | * | 8/1992 | Castro | 706/33 |
| 5,136,178 A | * | 8/1992 | Castro | 706/33 |
| 5,155,377 A | * | 10/1992 | Castro | 706/33 |
| 5,161,203 A | * | 11/1992 | Buckley | 382/157 |
| 5,235,650 A | | 8/1993 | Jeong | 382/36 |
| 5,302,838 A | * | 4/1994 | Roenker et al. | 257/14 |
| 5,323,471 A | | 6/1994 | Hayashi | 382/15 |
| 5,355,435 A | * | 10/1994 | DeYoung et al. | 706/26 |
| 5,508,529 A | * | 4/1996 | Roenker et al. | 257/14 |
| 5,509,105 A | * | 4/1996 | Roenker et al. | 706/33 |
| 5,581,660 A | | 12/1996 | Horan | |
| 5,587,668 A | | 12/1996 | Shibata et al. | |
| 5,648,926 A | * | 7/1997 | Douglas et al. | 708/801 |
| 5,704,016 A | | 12/1997 | Shigematsu et al. | |

OTHER PUBLICATIONS

Houselander, P.K.; Taylor, J.T., Implementation of artificial neural networks using current mode analogue circuit techniques, Current Mode Analogue Circuits, IEE Colloquium on, 1989, pp: 5/1–5/6, Jan. 1989.*

Elias, J.G.; Northmore, D.P.M., Programmable dynamics in an analog VLSI neuromorph, Neural Networks, 1994. IEEE World Congress on Computational Intelligence., 1994 IEEE International Conference on, vol.: 4, Jun. 27–Jul. 2 , 1994, pp: 2028–2033 vol. 4, Jun. 1994.*

Habib, M.K.; Akel, H.; Newcomb, R.W., Logic gate formed neuron type processing element, Circuits and Systems, 1988., IEEE International Symposium on, Jun. 7–9, 1988, pp: 491–494 vol. 1, Jun. 1988.*

Salam, F.M.A., New artificial neural net models: basic theory and characteristics, Circuits and Systems, 1990., IEEE International Symposium on, May 1–3, 1990, pp: 200–203 vol. 1, May 1990.*

Elias, J.G., Spatial–temporal properties of artificial dendritic trees, Neural Networks, 1992. IJCNN., International Joint Conference on, vol: 2, Jun. 7–11, 1992, pp.: 19–26 vol. 2, Jun. 1992.*

Anthony M. Zador and Barak A. Pearlmutter; VC dimension of an integrate–and–fire neuron model; Proceedings of the ninth annual conference on Computational learning theory, 1996, pp. 10–18, Jun. 1992.*

Kandel, M.D., Eric R., "Principles of Neural Science", Second Edition, *Elsevier Science Publishing Co.*, 1985, Part V, Chap. 29, pp. 372–381.

Martin, John H., "Principles of Neural Science", Second Edition, *Elsevier Science Publishing Co.*, 1985, Part VIII, Chap. 48, pp. 637, 639.

Shepard, Gordon and Koch, Christof, "The Synaptic Organization of the Brain", Third Edition, *Oxford University Press*, 1990, pp. 22–23, 26–27.

Douglas, Rodney J. and Martin, Kevan A.C., "The Synaptic Organization of the Brain", Third Edition, *Oxford University Press*, 1990, pp. 404–405.

Shepard, Gordon, "Computational Neuroscience", *MIT Press*, 1990, Chap. 8, pp. 88, 93.

Feldman, Jerome A., "Computational Neuroscience", *MIT Press*, 1990, pp. 170–171.

Fuster, M. Joaquin, "Memory in the Cerebral Cortex", *MIT Press*, 1995, Chap. 4, pp. 50–51.

Contreras, et al., "Control of Spatiotemporal Coherence of a Thalamic Oscillation by Corticothalamic Feedback", *Science*, vol. 274, Nov. 1, 1996, pp. 771–774.

Diorio, et al., "A Single Transistor Silicon Synapse", *IEEE Transactions on Electron Devices*, vol. 43, No. 11, Nov. 1996, pp. 1972–1980.

Karayiannis, N.B. et al., "Fuzzy Pattern Classification Using Feedforward Neural Networks with Multilevel Hidden Neurons", 1994 International Conference on Neural Networks, IEEE World Congress on Computational Intelligence, Jul. 1994, vol. 3, pp. 1577–1582.

Malinowski, A. et al., "Capabilites and Limitations of Feedforward Neural Networks with Multilevel Neurons", 1995 IEEE International Symposium on Circuits and Systems, May 1995, vol. 1, pp. 131–134.

Kamat, H.V. et al., "Direct Adaptive Control of Nonlinear Systems Using a Dynamic Neural Network", IEEE/IAS International Conference on Industrial Automation and Control 1995, Jan. 1995, pp. 269–274.

Liaw, Jim–Shih et al., "Computing with Dynamic Synapses: a Case Study of Speech Recognition", International Conference on Neural Networks 1997, Jun. 1997, vol. 1, pp. 350–355.

* cited by examiner

E-CELL (EQUIVALENT CELL) AND THE BASIC CIRCUIT MODULES OF E-CIRCUITS: E-CELL PAIR TOTEM, THE BASIC MEMORY CIRCUIT AND ASSOCIATION EXTENSION

This application claims priority from provisional application number 60/067,125 Title: "Methods and Apparatuses for Implementing Equivalent Cells, Memory Circuits, General Purpose Recognition Circuits, and Machine Vision Systems," filed Dec. 2, 1997; It is also related to utility patent application, Ser. No. 09/201,414, entitled "General Purpose Recognition E-Circuits Capable of Translation-Tolerant Recognition, Scene Segmentation and Attention Shift, and Their application to Machine Vision" filed on even date herewith, both of which are incorporated herein by reference.

BACKGROUND OF THE INVENTION

1. Field of Invention

The invention pertains to the fields of pattern recognition, scene segmentation, machine vision and machine speech recognition, and neuromorphic engineering. The invention constitutes a basic building block of a new class of systems to implement perceptual and cognitive functions in various sensory and conceptual domains.

2. Discussion of Related Art

The history of neurologically inspired computing technology goes back at least several decades. The field lay relatively quiescent until the mid 1980s when the popularization of the multi-layer "artificial neural net" (ANN), usually emulated in software, overcame a decade and a half of skepticism about the technology largely engendered by an influential book "Perceptrons" by Marvin Minsky and Seymour Papaert. The multilayer ANN, particularly ones trained by various algorithms of backward propagation of an error signal, proved capable of a wide range of classification tasks. Though the differences between ANNs and biological neural circuitry was evident, the lack of an alternative computational hypothesis for the biological circuitry at first attracted some in the neuroscience community to adopt the ANN in its various forms as a model of neural computation. The limitations of the ANN, however, became apparent in both technological application and as a computational model for the brain. The ANN has become an accepted part of the computational repertoire for solving certain classes of classification problems and problems involving capturing of complex functions from a large set of training data.

However, the ANN on its own has not provided the basis for solutions to the more complex problems of vision, speech recognition, and other sensory and cognitive computation. Problems of segmentation, recognition of signals under various transformations, learning from single or very limited presentations of data, regularity extract, and many other real world recognition problem have to date eluded solution by ANN or any other neurally inspired techniques.

Experimental neuroscience has revealed that cortical and other neural architecture is far more complicated than any ANN. Realistic simulations of large neurons such as pyramidal or Purkinje cells suggest that individual neurons are capable of significant computation on their own, which must be the basis of the computations performed by circuits containing myriads of such cells. Experiment has also determined that connectivity between neurons is highly specific and becomes more so during the initial learning by organisms. Neurons themselves are specialized, not uniform. Strong evidence exists that synchronized oscillations across the cortices play a role in recognition. And perhaps most important is the fact that backward or descending signal paths are at least as numerous as the forward or ascending signal paths from sensory organs to progressively "higher" cortices.

BRIEF DESCRIPTION OF TEE INVENTION

The invention (the e-cell and building block e-circuit modules composed of e-cells) constitutes the base components of a technology system inspired by the neuroanatomical and neurophysiological evidence mentioned above which is ignored by the traditional ANN technology, and gives rise to system organization and computational capabilities quite distinct from ANNs. When combined into basic e-circuit modules, the e-cell provides the basis of systems capable of scene segmentation, recognition of signals under translation, and where applicable under scaling and rotation and well as degradation by noise and occlusion. The systems are capable of learning novel percepts with a single presentation, establishing association and context between percepts and percept classes. In addition the systems are capable, without supervision or auxiliary "hints", of extracting signal regularities from unsegmented signal fields so as to identify which segments of the fields constitute stable percepts such as words or objects.

The E-Cell

The e-cell is the sole computational element of which circuits are built. It can be configured by a combination of specification and learning to perform a multiplicity of computational tasks. Important configuration variants involve (1) "dendritic" architecture and behavior (2) rise time and decay rates (3) learning protocols (4) bias inputs It consists of a cell body, an output terminal, and set of tree-connected input regions each of which have one or more input terminals and corresponding stored weights. Each input and its corresponding weight is termed a synapse. Each region computes the dot product of the vector of its current inputs and current weights and may modify this with a bias term. The regions may be instructed to learn by altering their current weights as a function of the currently applied inputs to each region. The regions are joined to the cell body by a binary tree structure in which the outputs of the regions comprise the leaves of the tree and each node is a two input junction which applies one of two classes of function to the node's pair of inputs, each of which may be either a region output or the output of another node. The body of the cell has at least one input—the output of the root node of the tree—and may have a bias input and a learning control input. The body of the cell computes the new output value of the cell based on the output of the root node of the tree and the current output of the cell itself. If the cell has a bias input, the value of that bias input is distributed to a certain class of regions which modify the dot product of their input and weight vectors by either adding the bias or by multiplying by 1.0 plus bias. If the cell has a learning input, the value of that input is added to the output of the root node and if a certain learning threshold is exceeded then all the regions capable of learning are signaled to apply their learning algorithm. If the sum of the inputs to a region instructed to learn are either zero or below a certain low threshold, the region follows one of two rules: (1) its weights are set to zero or (2) its weights are left unchanged. If the sum of inputs to a region instructed to learn are above the mentioned threshold, then the region alters its weight in one of two ways: (1) each weight is altered to be proportional to its corresponding input such that the dot product of the new weights and current inputs is normalized to a standard output (e.g. 1.0) or (2) each weight is altered incrementally from its current weight toward the weights that would satisfy condition (1). The first learning rule is termed episodic learning and is intended to capture the values of a set of inputs in one learning cycle. The second learning rule is termed incremental and is intended to capture a set of values representative of multiple but related sets of inputs.

Basic E-Circuit Modules

The invention includes a set of elementary e-circuit modules assembled from e-cells. The resulting system organization and computational capabilities are quite distinct from ANNs. The e-circuit modules constituting this invention can be composed into higher level e-circuits capable of scene segmentation, recognition of signals under translation, and where applicable under scaling and rotation and well as degradation by noise and occlusion. The systems are capable of learning novel percepts with a single presentation, establishing association and context between percepts and percept classes. These higher level e-circuits are the subject of an associated utility application.

The first component e-circuit of the invention is termed the basic e-cell pair. It actually contains three e-cells. The two major e-cells (the pair) are connected in a "complementary" fashion thus providing segments of associated forward and backward signal paths. An inhibitory e-cell connects the output of backward e-cell to an input of the forward e-cell and thus provides a inhibitory feedback path which is responsible for the oscillatory dynamics at the heart of the e-circuit's computation. The inhibitory e-cell has no connection external to the basic e-cell pair module. The basic e-cell pair also provides an excitatory connection between the output of the forward e-cell to an input of the backward e-cell which can provided the closure of the loop from forward to backward paths.

Populous groups of e-cell pairs comprise the stages of e-circuits. The e-cell populations that make up stages are termed groups and are divided into clusters.

E-circuits always consist of multiple stages, so any e-cell pair will be connected to one or more e-cell pairs upstream and/or downstream of it. A sequence of two or more interconnected e-cell pairs from adjacent stages constitutes the basic e-cell pair totem. The totem is a useful unit to analyze in isolation because it determines the fundamental dynamics of the e-circuit. In action, e-circuits behave to a large extent as large collections of totems, though the totems are not independent due to lateral connections between them and convergences of a number of totems on a single e-cell pair in certain stages of the circuit.

The basic two-stage totem provides the structure which is specialized to become the basic memory circuit, which is the second standard e-circuit component of this invention.

The basic memory circuit is extended to a third stage to become the basic memory circuit with context and association, which is the third standard e-circuit component of this invention.

BRIEF DESCRIPTION OF THE DRAWINGS

Note: all density plot figures show the amplitude of activity of a group of e-cells (x-axis) over time measured in arbitrary units (y-axis), where the darkest trace corresponds to the highest amplitude, and zero amplitude is white.

DETAILED DESCRIPTION OF THE INVENTION

Preferred Embodiments

Figure 1:
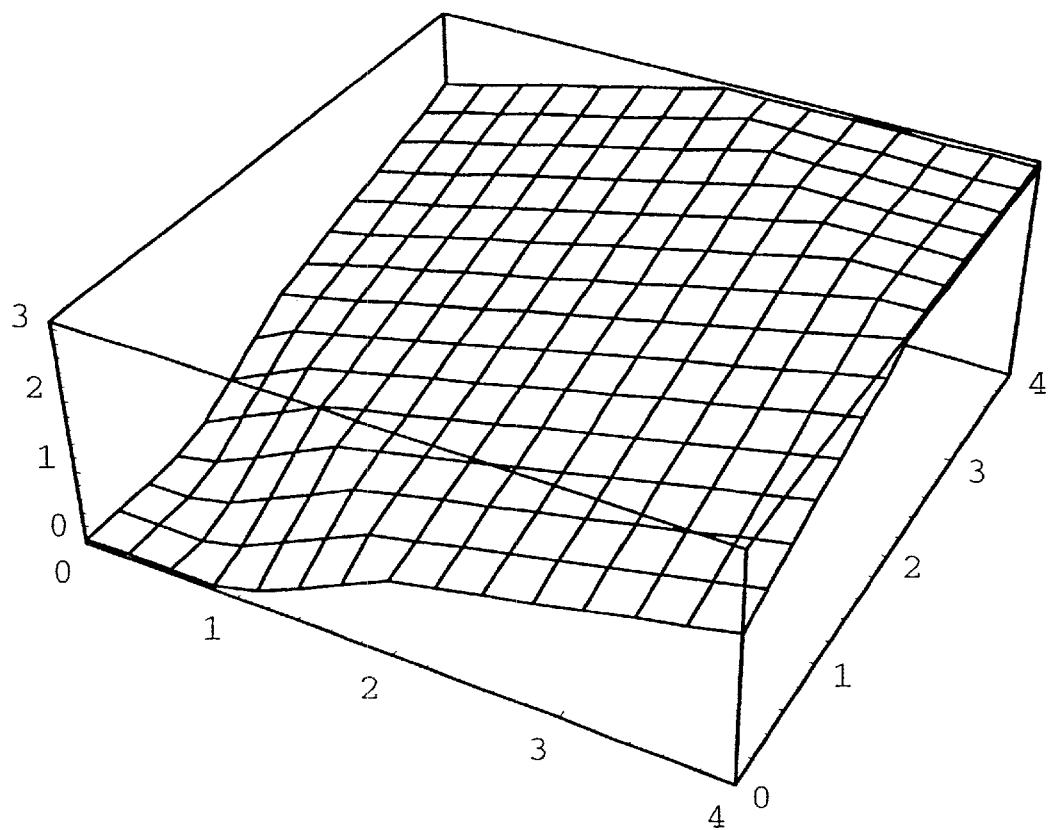
FIG. 1 shows the value of a piecewise linear implementation of a node adjunctive function. Two input arguments shown on the x and y axes respectively, function value on the z axis.

Practical e-circuits typically involve large numbers (tens of thousands to millions) of e-cells, and the connections between them are both numerous and highly specific to the function of each group of e-cells within the e-circuit. The design or specification of such e-circuits and the characteristics and configurations of the e-cells within them must therefore be tested before being committed to implementation in any uncorrectable medium.

The e-cell, and consequently the e-circuits composed of them, in practice require at least two embodiments:
1) a software simulation for verifying the configuration of all individual e-cells within an e-circuit and for verifying the pattern of interconnections between e-cells,
2) a hardware implementation capable of delivering the performance of the system necessary to the application.

In order for the software simulation to verify an e-circuit and e-cell system design, a common specification of the e-cells and e-circuit underlies both. In other words, the specification that completely configures and drives the software simulation can be compiled into a hardware specification for the preferred embodiments.

The particular hardware technology preferred for embodiment of the invention depends on the application. Three dimensions drive the choice: speed, scale and flexibility. Since the e-circuits built of e-cells function on principles derived from biological neural circuits, the necessary effective speed of the e-cells themselves is very slow compared to digital electronics. It is therefore practical to implement e-cells in analog electronic microcircuitry. All of the components of the e-cell have behavior that has already been implemented in various contexts in electronic microcircuitry. For small and moderate scale applications e-cell counts make it possible to build complete e-circuits on one or a few chips. However, the e-cell counts and interconnection densities necessary for e-circuits applicable to massive data domains such as vision may require deployment on many chips. The pin counts on current chip packaging poses a limitation on the interconnections if each e-cell whose output must be carried to another chip requires a dedicated pin or connector on the chip package. This problem has been addressed in other contexts, and various sampling and multiplexing schemes have been evolved in both commercial and experimental applications to solve the problem. (Example: John Lazzaro and John Wawrzynek, "A Multi-Sender Asynchronous Extension to the AER Protocol", Computer Science Division, UC Berkeley.) The generalized solution, of which there are several specific variants, consists of sampling the analog level of a multiplicity of outputs on-chip, encoding the level and identifying the source with an address code, and multiplexing a large quantity of these level-identity pairs onto a small set of chip connectors which communicate with a compatible bus to carry the signals between chips. All the destination chips have circuitry which monitor this bus and pick off and covert to analog those signals which are destined to devices on that chip. Thus a large quantity of connections between those two chips can be virtualized over limited hardware connections: the great difference of the operating frequency of the analog devices (such as e-cells) on chip and the speed of the multiplexed connections between the chips makes this practical.

For applications which require relatively low e-cell counts (in the thousands or ten thousands at present) but frequent reconfiguration a purely digital embodiment is practical using low cost digital signal processors in various quantities. In this embodiment, the software simulation is directly deployed on the DSPs and distributed across a sufficient number to make the performance adequate to the application.

The detailed description of the e-cell is thus applicable to all the preferred embodiments. Particular equations describe dynamics which are efficient to implement the software simulation, since this is the starting point of all embodiments. The e-cell itself is very tolerant of variations in the particularity of its dynamics. The sigmoid equation of the cell body can be equally implemented by the input-output relation of most common transistors, for example, and this substitution has been common practice in electronically implemented ANNs which also rely on a sigmoidal transfer function.

Another variant on the electronic embodiment of the e-cell substitutes sampled analog for continuous analog. This might be occasioned by power dissipation considerations or the multiplexing of devices on chip to virtualize large e-cell counts with a smaller number of transistors.

The difference equations expressing the behavior of the e-cell normally taken to represent inputs which are continuous or synchronously sampled. For e-cells implemented with asynchronously sampled inputs the equations are taken to represent the response to a spike or event density. The inputs in the equations are in this case the momentary value of a function integrating the amplitude and temporal density of actual input signal spikes or events on the corresponding input terminal.

The invention also has alternative embodiments in optical and neurocellular technologies, although these are considered to be more distant in time and secondary to the analog, digital and hybrid analog and digital implementations.

The current software embodiment consists of a two section Fortran 90 program. The first part of the program takes as input a formal e-circuit description, including specification for the characteristics and configurations of the necessary e-cells, and compiles this specification into the data structures to drive the simulation. The second part of the program executes the simulation and records the behavior of an arbitrary set of e-cells specified as an appendage to the formal e-circuit specification. The input conditions for the simulation are specified separately. The program is structured to parallelize efficiently and distribute onto an arbitrary number of processors on either a distributed memory or shared memory parallel computer.

The e-circuit and e-cell specification has a formal syntax described in an extended BNF notation. The part of the specification relevant to the e-cell itself is included herein.

The E-Cell

Each e-cell computes the current value of its output vt from a combining function dcf over n dendritic tree regions:

$$v_t = v_{t-1}(1 - k_{decay}) + k_r \cdot \max\left(\frac{k_1}{1 + e^{k_2(D-k_3)}} + k_4, 0.0\right) \quad \text{(i)}$$

where
$k_{1-4}$ are shape parameters
$k_{decay}$ is decay time parameter
$k_r$ is gain parameter
$D(\ )$ is defined in (ii)

$$D = T(dcf(regionfn(w_1 \cdot v'_1, b), regionfn(w_2 \cdot v'_2, b), \ldots, regionfn(w_n \cdot v'_n, b)), k_{dcf\_threshold}) \quad \text{(ii)}$$

where
- $w_1$ is the weight vector for region i at time t
- $v'_1$ is the input vector for region i at time t
- $k_{dcf\_threshold}$ is the threshold applied to the entire dcf
- b is a bias input signal
- regionfn( ) is defined in (iii)
- dcf( ) is defined in (iv)
- T( ) is defined in (v)

(a) $regionfn(x, b) =$  (iii)

$$s_{pol} \cdot \begin{cases} \min(0, k_{regthresh}) & \text{if } x + s_k \cdot b < k_{regthresh} \\ x + s_k \cdot b & \text{if } k_{regthresh} \leq x + s_k \cdot b < k_{regclip} \\ k_{regclip} & \text{if } k_{regclip} \leq x + s_k \cdot b \end{cases}$$

(b) $regionfn(x, b) = s_{pol} \cdot$ $$\begin{cases} \min(0, k_{regthresh}) & \text{if } x \cdot (1 + s_k \cdot b) < k_{regthresh} \\ x \cdot (1 + s_k \cdot b) & \text{if } k_{regthresh} \leq x \cdot (1 + s_k \cdot b) < k_{regclip} \\ k_{regclip} & \text{if } k_{regclip} \leq x \cdot (1 + s_k \cdot b) \end{cases}$$

where
- $s_k$ is a bias "switch" with values 0,1 depending on region type
- $s_{pol}$ is 1 if excitatory region, -1 if inhibitory region
- $k_{regthresh}$, $k_{regclip}$ are threshold and clipping constants, $k_{regthresh}$ may be negative $$dcf(r_1, \ldots, r_n) = nodefn(<node\_ex>, <node\_ex>)|<region\_range\_ex> \quad (iv)$$

where
- $node\_ex := nodefn(<node\_ex>, <node\_ex>)$
- $|r_i| <region\_range\_ex>$
- $region\_range\_ex := rangesumfn(r_p, \ldots, r_q)$ p2 nodefn( ) is defined in (vii) p2 rangesumfn( ) is defined in (vi)

Thus the dcf can be represented as a functional expression which captures a tree organization of nodefunctions.

A simple example:

$$dcf(r_1, r_2, r_3, r_4, r_5) = nodefn(nodefn(nodefn(r_1, r_2), nodefn(r_3, r_4)), r_5)$$

$$T(x, k) = \begin{cases} 0 & \text{if } x < k \\ x & \text{if } x \geq k \end{cases} \quad (v)$$

A subset of adjacent regions is referred to as a region-range. The dendritic combining function dcf applies one of three classes of function to the output of regions or region-ranges to arrive at a value for the entire ensemble of regions.

1) Regions within a region-range are combined by thresholded summation referred to below as the rangesumfn:

$$rangesumfn(r_n, \ldots, r_m) =$$

$$\begin{cases} 0 & \text{if } vsum_{range} < k_{range} < k_{range\_threshold} \\ vsum_{range} & \text{if } vsum_{range} \geq k_{range\_threshold} \end{cases} \quad (vi)$$

where $$vsum_{range} = \frac{1}{n - m + 1} \cdot \sum_{i=m,n} r_i$$

n ... m are the index bounds of the regions in the range.
$r_i$ is the output of the i-th region
$k_{range\_threshold}$ the threshold for the region-range 2) Regions and region-ranges are organized as the leaves of any binary tree. The dcf applies one of four dyadic node functions at each bifurcation of the tree, yielding a single value at the root of the tree.

$$nodefn(in1, in2) = \max\left(0, \begin{cases} T(in1 + in2, k_{sum\_thresh}) \\ T\left(\frac{in1 + in2}{2}, k_{avg\_thresh}\right) \\ T(in1 \cdot in2, k_{prod\_thresh}) \\ adj(in1, in2) \end{cases}\right) \quad (vii)$$

where
- $k_{sum\_threshold} \geq 0$
- $k_{avg\_threshold} \geq 0$
- $k_{prod\_threshold} \geq 0$
- T( ) the threshold function is defined as above in (v)
- adj( ) is defined in (viii) or (ix)

The first three definitions of nodefn( ) are termed thresholded sum, thresholded average, and thresholded product, respectively. The fourth definition is termed the adjunctive function, and is now defined.

The adjunctive function, or adjunction, is a term introduced to indicate a class of functions with a multiplicative regime (MR) for arguments summing up to a certain threshold and an additive regime (AR) for arguments summing above that threshold. The multiplicative regime only requires that if one of the arguments is zero and the other argument is anywhere within its unbiased range the adjunction is zero. A threshold can therefore be used to implement it. The additive regime only requires that if one of the arguments is zero, the other argument can be biased to a range of values such that the adjunction value ranges between zero and the maximum unbiased value. For efficiency the adjunction used in simulation is $$adj(x, y) = \begin{cases} 0 & \text{if } x + y - 1 \leq 0 \\ x + y - 1 & \text{if } 0 < x + y \leq 2 \\ \frac{x + y}{2} & \text{if } 2 < x + y \leq 2k_{clip} \\ k_{clip} & \text{if } 2k_{clip} < x + y \end{cases} \quad (viii)$$

where the unbiased range of x and y is 0.0 to 1.0.

The surface computed by this piecewise linear implementation is shown in FIG. 1.

The "multiplicative regime" (MR) is the area $0 \geq x + y < 1$. Any area outside of this is the "additive regime" (AR). The adjunction saturates at a value $k_{clip}$.

Figure 2:
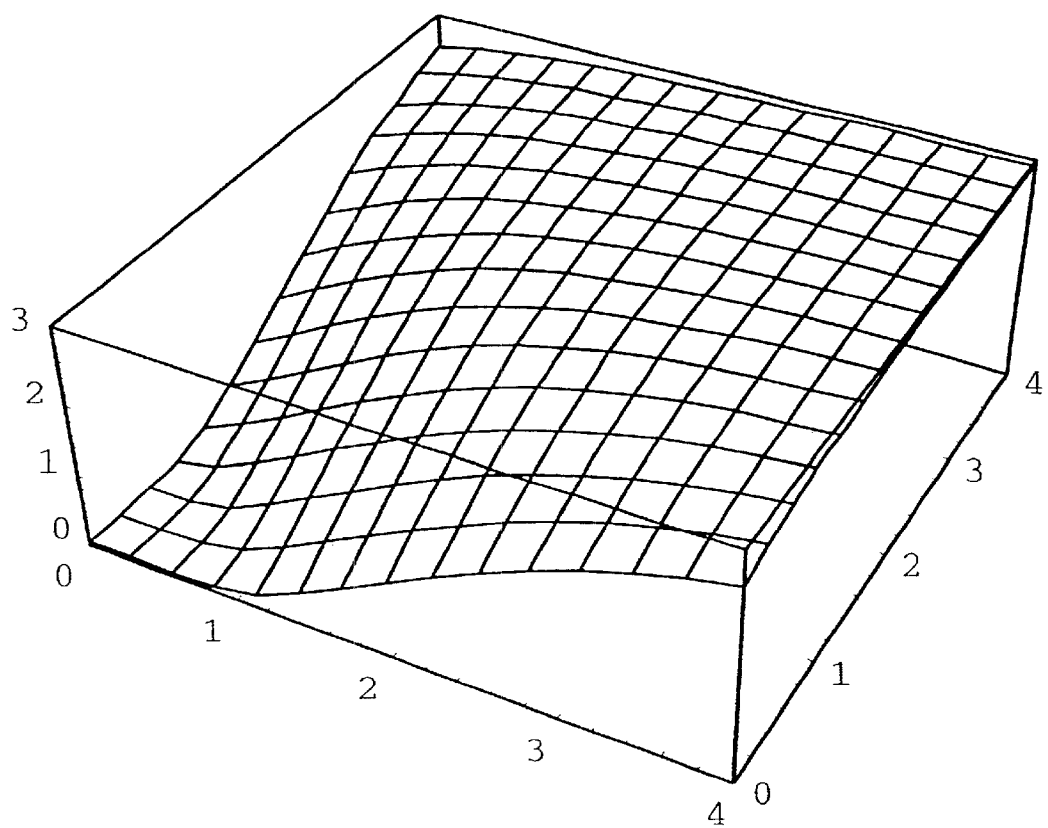
FIG. 2 shows the value of a thresholded sigmoid implementation of a node adjunctive function. Two input arguments shown on the x and y axes respectively, function value on the z axis.

The behavior of the circuits is tolerant of the implementation of the adjunction, so any continuous function with this character should suffice. A sigmoid implementation of a similar adjunction $$adj(x, y) = \max\left(\frac{k_1}{1 + e^{k_2(x + y - k_3)}} + k_4, 0.0\right) \quad (ix)$$

where
$k_1 = 4.0$, $k_2 = -1.1$, $k_3 = 2.0$, $k_4 = -1.0$ yields a similar, equally usable surface, shown in FIG. 2.

The dual nature (disjunctive and conjunctive) of adjunctions should be noted, as it plays an important role in the larger behavior of the circuits. An entirely adjunctive dcf operating in the multiplicative regime requires all of its regions to have inputs which reasonably match their synaptic weights in order for the dcf itself to take some non-zero value, and the match must be very close for the dcf to take its maximum value. With its active inputs biased increasingly upward, the same dcf increasingly operates in the additive regime and takes a non-zero value even in the absence or mismatch of inputs to one or more regions. Thus simple bias applied to the inputs (or to the regions internally) can continuously vary the stringency of the match calculated by the e-cell between its synaptic weights and its inputs.

Regions are characterized by number of synapses and whether the region itself is excitatory or inhibitory. Within an excitatory region individual synapses may be excitatory or inhibitory, but an excitatory region is constrained to taking values between 0.0 and a positive saturation value. All synapses in an inhibitory region are inhibitory and the region is constrained to taking values between 0.0 and a negative saturation value. Inhibitory regions must obviously be combined additively in the dcf, and usually gate more distal regions. Inhibitory synapses in excitatory regions always gate excitatory synapses within the same region.

The degrees of freedom inherent in dcf and in the individual character of the regions can give rise to classes of e-cells with a wide range of computational behavior.

Learning in E-cells

In the circuits to be considered only some excitatory regions are capable of learning. Two kinds of learning behavior occur: episodic and incremental. Under episodic learning, prior weights of affected synapses have no influence on the new weights. When an e-cell enters the condition in which learning takes place (generally when D in eq.(i) exceeds a high threshold) one of the following behaviors occurs:

(a) All regions capable of learning reset their weight vector $w_i$.
(b) All regions capable of learning which have input above some threshold reset their weight vector $w_i$.

In either case the new weight values are adjusted to reflect the distribution of the input vector $v'_i$ and normalize the dot product $w_i \cdot v'_i$. Under episodic learning $$\text{if } \sum w_i > c_{threshold} \text{ then } w_i = \frac{v'_i}{\sum_{j=1}^{n} (v'_j)^2} \quad i = 1K\ n \quad \text{(x)}$$

Under incremental learning the weight vector is moved from its current values a certain distance toward the value it would take under episodic learning.

$$\text{if } \sum w_i > c_{threshold} \text{ then } \Delta w_{i_i} = \frac{k \cdot v'_i}{\sum_{j=1}^{n} (v'_j)^2} - w_{i_{i-1}} \quad i = 1K\ n \quad \text{(xi)}$$

where $k \ll 1$.

If during learning the sum of all inputs to a region is zero or less than a low region learning threshold, $c_{threshold}$, then the region input is considered null and must be specially handled. This is discussed below.

Triggering Learning

An e-cell is instructed to learn by raising the input to the cell body function above a high excitation threshold. A specialized input region at the root of the dcf tree with a very high input weight allows an external signal to raise the excitation to a level above the learning threshold. When this threshold is exceeded the regions capable of learning are triggered to execute their particular learning protocol.

The Null Region Problem

A practical problem arises when an e-cell with set of regions combined by an adjunctive or multiplicative tree must learn an input pattern which applies no activity to one or more of those regions. In the episodic learning algorithm as currently presented the synapses of a region with no input are undefined. If those synapses should be set to zero weight, the region would always veto the output of the dcj If the synapses should be set to some non-zero weight, the training pattern itself would result in no output because that pattern's absence of input to the region in question would veto the rest of the regions.

The behavior that is desired is for any region without excitation during learning to drop out of the dcf tree, leaving only regions which had input during the application of the training pattern. This is accomplished by giving any region with no input during learning a null status, which when presented as an argument to an adjunction, simply causes the other argument to be propagated through unchanged. If the other argument is a null, null is propagated as the value of the adjunction.

For incremental learning the deltas for null input regions must also be defined. If a region trained to a certain non-null pattern may have a null input applied during incremental learning one of several strategies may be implemented: (1) no modification, (2) assign null status to the region, (3) increase the non-zero weights in the region in proportion to their current weights. The choice depends on the application.

Null status must be capable of being propagated through the nodes of the dcf tree. Thus both regions and nodes must be capable of taking a value that can be interpreted by the nodal functions and by the cell body as null. Nodal functions (whether adjunctive or additive) propagate null if both inputs are null, propagate the non-null input unchanged if one of the inputs is null, and compute their normal output value if neither input is null. The cell body converts a null output from the root node to zero in computing its new cell output.

(xii)

|  | input 2: value2 | input 2: null |
|---|---|---|
| input 1: value1 | nodefn(value1, value2) | value1 |
| input 1: null | value2 | null | where
  nodefn( ) is defined above in (vii)

Electronic Implementation of E-cells

All of the functions describing e-cell behavior or their equivalents have direct analog microelectronic realizations and computed digital realizations, as well as hybrid analog/digital realizations. Circuits built of e-cells are tolerant of variations in the functions implementing the e-cell behavior so a broad class of embodiments is possible.

Figure 3:
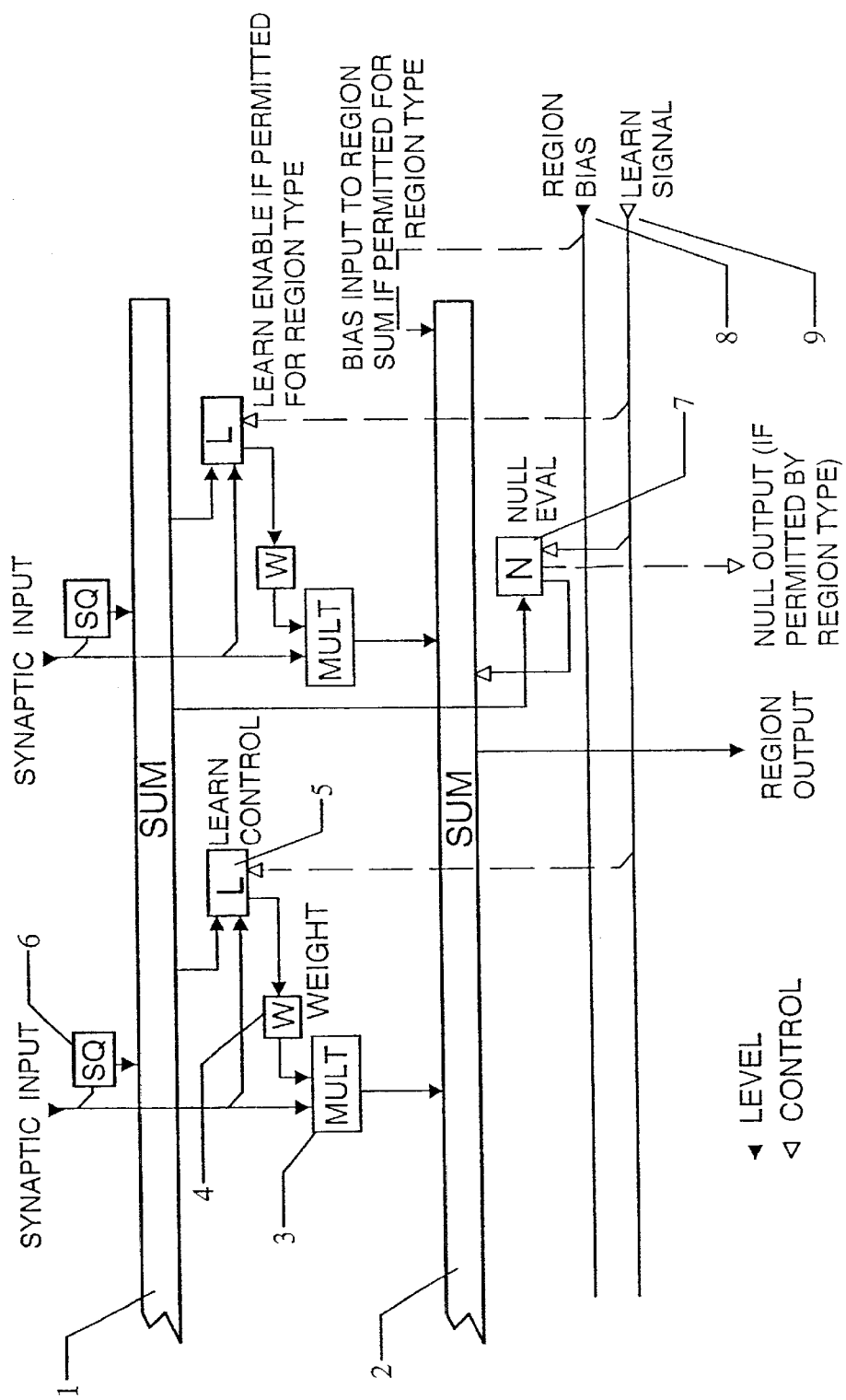
FIG. 3 shows the block data and flow diagram of a generic implementation of a region.

FIG. 3 is a hardware implementation block diagram illustrating the signal and control flow within a region. Each synaptic input and associated weight w go to a multiplier 3. The outputs of the multipliers 3 for all regions are summed along with a bias input 8 in the sum circuit 2. Note: this circuit implements the additive bias equation (iii)(a). Synaptic weight w is stored in a non-volatile analog memory 4, whose value is controlled by circuit L 5. The inputs to L 5 are the value of each synaptic input and the sum of the squares of all the synaptic input for the region. The latter value is computed by multipliers 6 which squares each synaptic input and a summer 1. 1, 6 and 5 implement equation (xi) or (xii) above. The region bias 8 and learn signal 9 can share a common signal line if the learn signal threshold in L 5 is above any region bias level, since the weight setting is unaffected by the region output. Null output indicates a region that had no input when learning took place (see text on null regions). Null region signaling can share the region output line if the null signal is beyond the excitatory and inhibitory signal ranges.

Both sum blocks 1 and 2 can be implemented by standard current summing techniques. The squaring operation sq 6 takes a single transistor configured as a multiplier of each region input by itself. Weight storage w 4 and multiplication 3 by an input (termed here and commonly in the literature as a "synapse") can be implemented with a single floating gate transistor. This is the only relatively uncommon microcircuitry necessary to implement the e-cell, though such implementations have been numerously reported in the literature. (Examples, P. Hasler, C. Diorio, B. A. Minch, and C. Mead, "Single Transistor learning synapses", Advances in Neural Informnation Processing Systems 7, MIT Press, pp 817–824, 1995; C. Diorio, P. Hasler, B. A. Minch, and C. Mead, "A single transistor MOS device for long term learning," U.S. Pat. No. 5,627,392, issued May 6, 1997) Non-volatile storage of analog values in a single transistor also underlies the implementation of high density commercial flash memory. The learning control circuit L 5 is implemented as a simple divider applied to the sum-of-square term output from the top summer and each input. The divider's output is applied as the learning input to the weight either directly for episodic learning or scaled by coefficient k for incremental learning. The logic to apply the learning value to w 4 is part of L 5 and controlled by the learning input to the region. This logic path can also be used to zero w. Standard gates implement the learning control logic L 5 and the null evaluation logic N 7.

The circuit block illustration for summing within region-ranges is not shown because it requires very simple, standard summing, thresholding and scaling circuitry applied to the outputs of all the regions within the region range.

Figure 4:
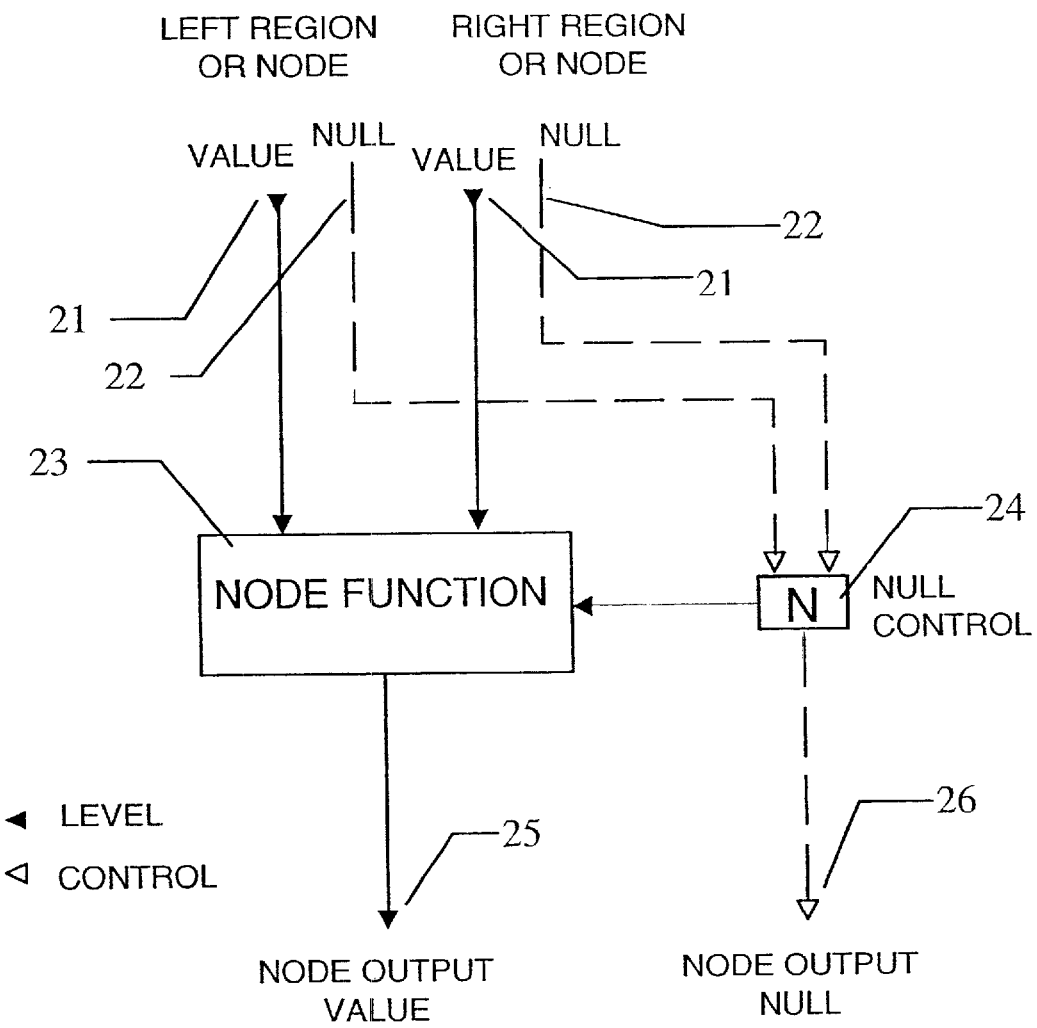
FIG. 4 shows the block data and flow diagram of a generic implementation of a node.

FIG. 4 is a hardware implementation block diagram illustrating the signal flow within a node at each dcf tree bifurcation. The computed function is described by the table eq (xii) and eq (vii). The node function block 23 computes one of the additive, multiplicative or adjunctive functions described in the text above on the left and right value inputs 21. Null control 24 alters the node function to pass a non-null input through to the output unchanged if there is a null on the opposite null input 22. If both null inputs are active then the null output 26 is enabled and the value output 25 from the node function is disabled. This allows sharing of a single line for both values and nulls between nodes if the null signaling level is outside the range of permitted value signaling levels.

The implementation of the node function block 23 depends on the particular dyadic function called for. A two input summing circuit is required to implement the additive node functions (a) and (b) above. A two input multiplier is required to implement the product node fuinction (c). The implementation of the adjunctive node function (d) requires a two input summer followed by threshold subtraction and a sigmoid-like transfer fuinction. This can be implemented with two or three transistors. The multiplicative regime (MR) should be located in the most linear regions of the transistor which implements the sigmoid like transfer function, so that the additive regime (AR) takes advantage of the saturation to limit the node output. The surface of the adjunctive function illustrated in FIG. 2 illustrates the kinship of the adjunction with the normal transfer function a transistor. Thresholding function To can either be implemented by using inherent transistor characteristics of the summer or multiplier or by adding a subsequent stage, depending on the threshold specified. The block null control N 24 implements the control portion of eq (xii) and can be built with standard logic gates.

Figure 5:
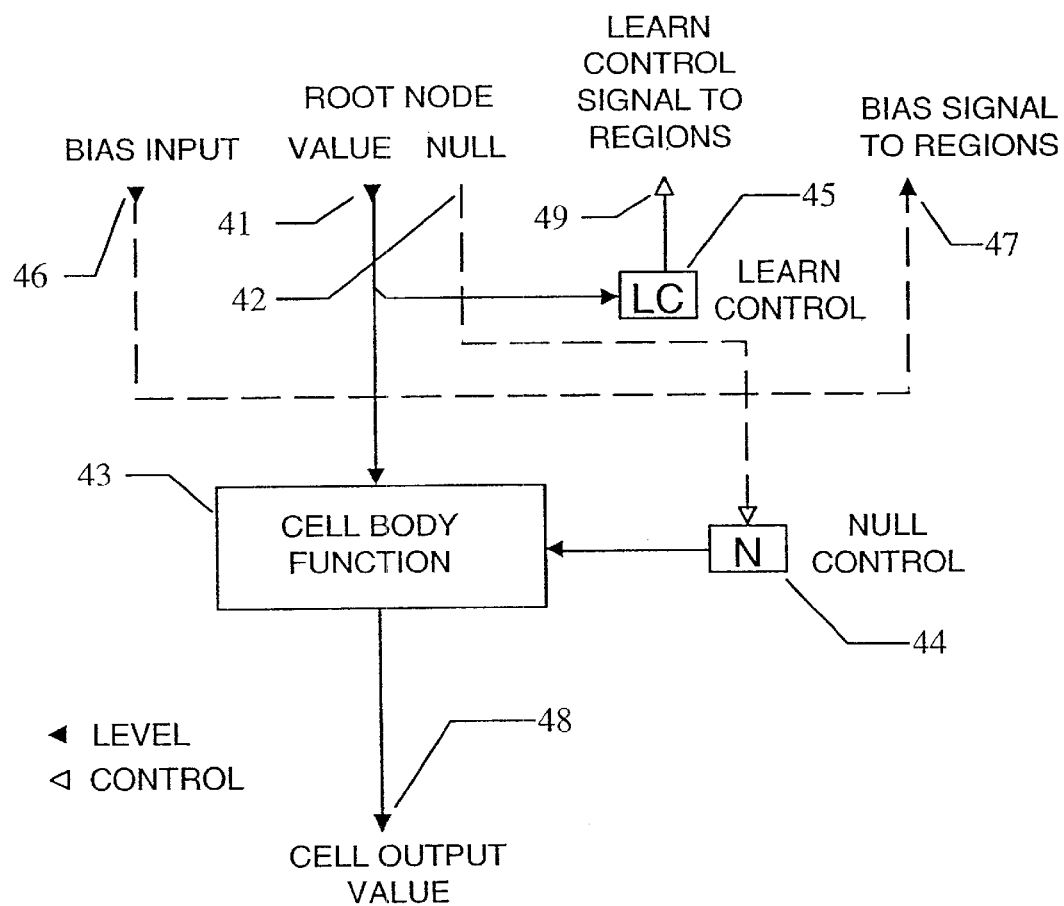
FIG. 5 shows the block data and flow diagram of a generic implementation of a cell body.

FIG. 5 illustrates the signal flow within the cell body. The cell body function 43 computes the cell output value from the dcf root node value 41 according to eq (i). If the input from the root exceeds the learning threshold as described in the text, LC 45 signals via the learn signal line 49 all regions capable of learning to execute their respective learning protocols. Bias input 46 to the e-cell is passed directly via the bias line 47 to those regions which utilize bias. If there is a null input 42 from the root node, the cell body function input is zeroed.

The cell body function 43 is implemented with a single transistor for the sigmoid and a capacitive shunt for the decay component. Here again, e-cell application tolerates a wide variety in the profiles of the sigmoid and the decay function. Null control N 44 and learning control LC 45 are implemented with standard logic. There need be no transforming or control circuitry on the bias input 46 which is transferred unmodified to all the regions which use it. However, both bias and learn control may need drivers to satisfy the loads of dcf structures with significant fan out. Also e-cells which drive large numbers of synapses may require multiple driver transistors after the sigmoid implementing transistor to prevent the loads from unduly affecting the rise time characteristics of the e-cell.

Figure 6:
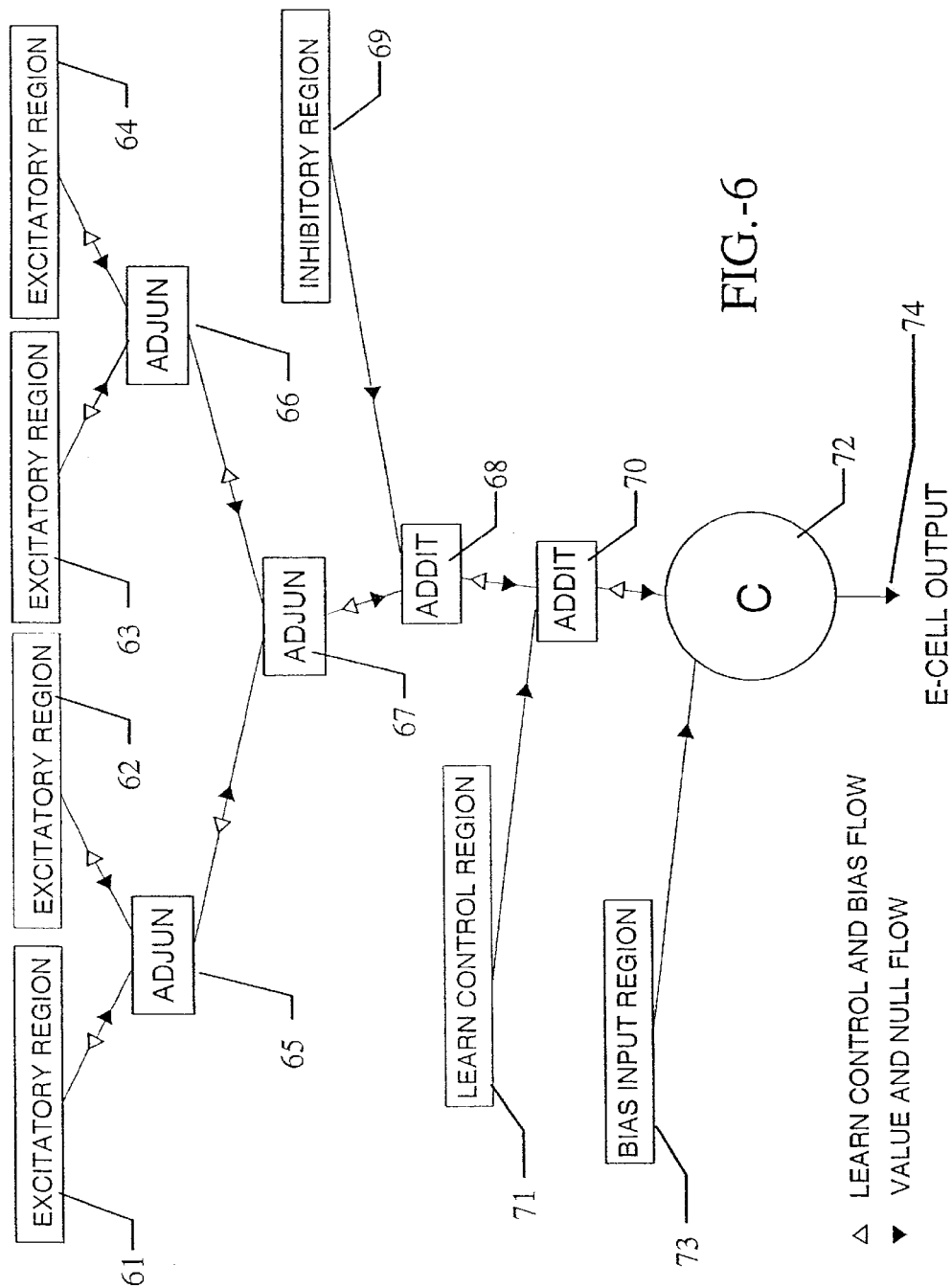
FIG. 6 shows the block flow diagram of a typical small e-cell.

FIG. 6 illustrates the relationship of various region types, the nodes (adjuns and addit) and the "cell body" C in a simple but typical e-cell. The lines connecting regions and nodes represent region output and null signaling flowing toward the cell body and learn control signaling and bias flowing away from the cell body. Excitatory regions 61, 62, 63, and 64 are combined by an adjunctive binary tree composed of nodes 65, 66, and 67. An inhibitory region 69 is combined into the dcf tree with an additive node 68 so it may block the output of the adjunction portion of the dcf. A learn control input region 71 is combined into the dcf tree with and additive node 70. This allows the output of the dcf to be raised above the learning control threshold in order to induce learning in the regions capable of learning. The bias input region 73 connects directly to the cell body C 72 which produces an output 74 which is the input to other e-cells.

Not all the e-cell internal functions need be present in some e-circuit roles. In practical e-circuits a significant population of e-cells do not need learning capabilities, have only additively combined regions and thus do not need to propagate nulls. The implementation of e-cells in such roles can omit the unneeded circuitry.

Cell Activity

Figure 7:
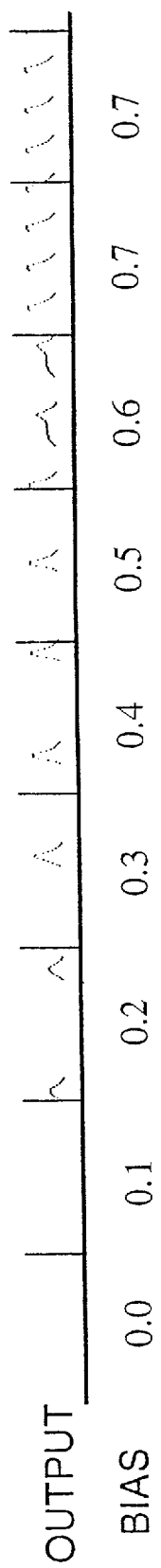
FIG. 7 shows the activity of an e-cell with nine of ten regions trained responding to a pattern with inputs on five of the nine trained non-null regions. Bias level is shown below activity pattern: increases 0.1 per horizontal division until oscillatory response is normal at bias 0.7.

FIG. 7 illustrates the behavior of an e-cell responding across a range of bias which shifts its dcf from the multiplicative regime (MR) to the additive regime (AR). The e-cell is configured to have ten adjunctively combined regions of 24 inputs per region. The training conditions cause the e-cell to learn a pattern in nine of its ten regions, leaving the tenth region null. A test pattern consisting of the middle five regions of the training pattern are then applied to the e-cell. The e-cell bias input is started at 0.0 and raised 0.1 per horizontal division (100 t) until a normal oscillatory response is evoked from the e-circuit at which point the bias is held constant, in this example at 0.7. Because there are regions of the e-cell trained to expect input but receiving none, the initial, MR, response of the e-cell is vetoed by the zero-input regions. As the bias is raised the e-cell starts to respond in AR, so that the zero-input regions cease to veto the response. The slow rise time at first keeps the response from rising to full output. After a few periods of bias increase the output reaches a maximum, but the rise time is too slow to induce full oscillation. Finally at bias 0.7 the rise time is fast enough to evoke a full oscillatory response from the e-circuit, and the bias is held at this level until the end of the test.

This data illustrates the ability of an e-cell to be configured to allow variable strictness in its matching response. This is an important characteristic in many applications including extracting of signal regularities from a set of unsegmented input fields. Note: a more primitive version of variable strictness matching may be implemented by using thresholding regions, additively combined, wherein each region's output is altered by variation in the applied bias. The adjunctive tree is the preferred implementation since the shape of the tree can be designed to implement complete veto by any region, if desired, and the adjunctive function allows smoother variation.

Circuits of E-Cells

The connectivity of an e-circuit is specified by a connection mapping fuinction cmf between e-cell outputs v and e-cell inputs v'. v is identified by e-cell, v' is indentified by <e-cell, region, synapse> tuples. In practice only the target-to-source mapping, indicated with a left-to-right arrow, is used $$cmf^v:<i,r,s>_{target} \rightarrow i_{source} \qquad (xiii)$$

where i specifies e-cell, r specifies region, s specifies synapse.

$$v'_{<i,r,s>_t} = v_{cmf^\sigma(<i,r,s<)_{t-1}} \qquad (xiv)$$

Eqs (i)–(xii), presented earlier, and Eqs (xiii)–(xiv) define the recurrence describing the full behavior of an e-circuit. The identity of a particular circuit lies primarily in its dcfs and cmf, although there is some variation in decay constants and sigmoid parameters in certain classes of e-cells. In specifying particular e-circuits cmf mappings are formally expressed in a syntax presented later. Schematic diagrams, however, are easier to comprehend and will be used to present the e-circuits here, though they must be necessarily abbreviated to just a few representative e-cells of each group in a circuit.

The following e-circuit forms define a set of standard cmf mappings and dcf structures.

The Standard E-Cell Pair Totem

A circuit pattern referred to as the standard totem forms the seed of all the circuits to be examined. It provides generic forward and backward signal paths and the connections between them. It serves as a basic module of repetition, forming the major partitions of the circuits (termed groups) between which the connections can be particularized en-masse by relatively simple specification.

Figure 8A:
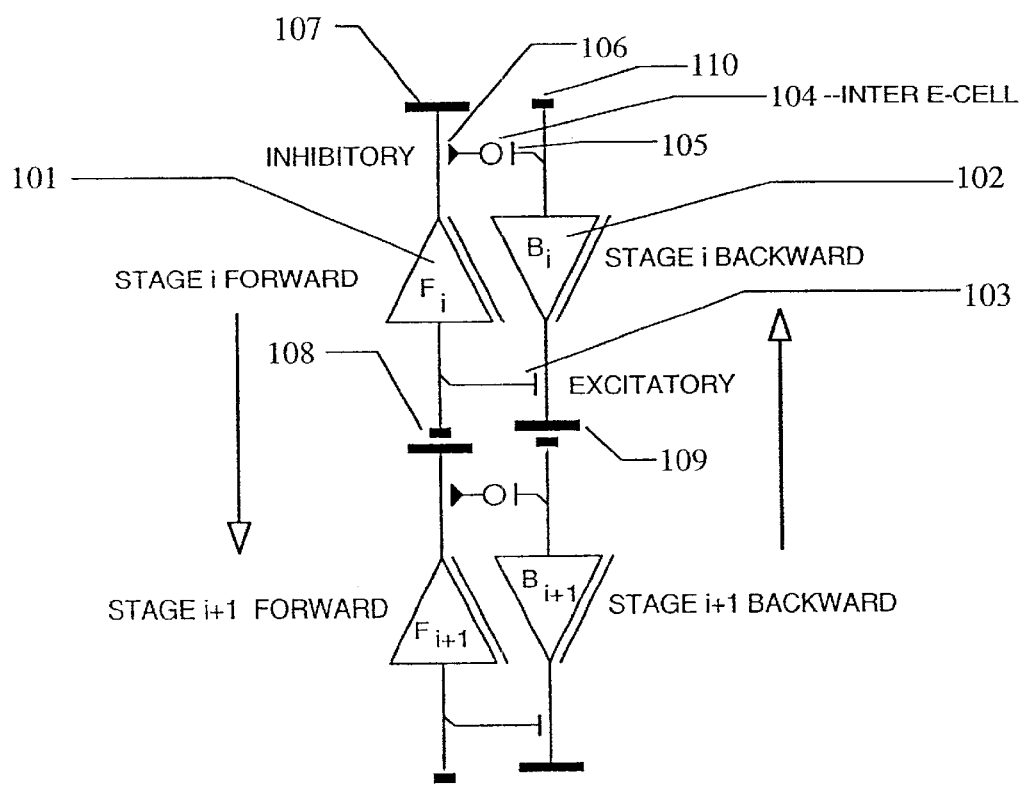
FIG. 8A shows two e-cell pairs connected as a two stage totem.
Figure 8B:
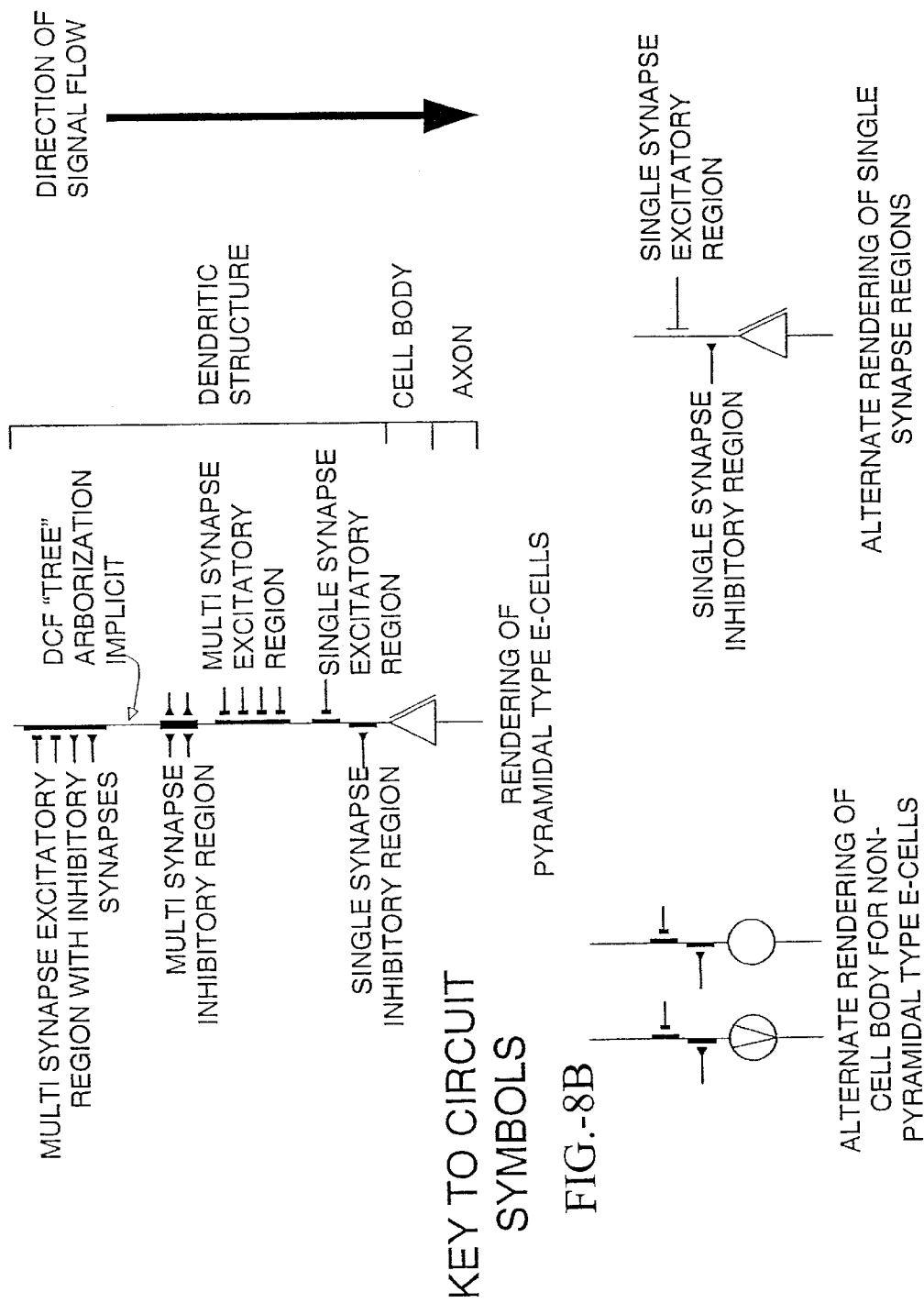
FIG. 8B is a key to the symbols for the circuit diagrams based on the e-cell.

FIG. 8A illustrates the standard two stage totem. The area in grey illustrates the E-cell pair, which is the basic module out of which totems and most e-circuits are constructed.

The e-cell pair consists of a forward e-cell $F_i$ 101, a backward e-cell $B_i$ 102, and inter e-cell 104. The term pair actually include three e-cells therefore, but only the forward e-cell $F_i$ 101, and the backward e-cell $B_i$ 102 are considered primary e-cells because their inputs and outputs make connections to other modules, while the inter E-cell 104 has no connections outside the module.

There is an excitatory synapse 103 from the forward e-cell 101 output to a proximal region of the backward e-cell 102 dendritic structure. Proximal means "near the cell body" and in this instance means that this region is nearer the cell body than regions 109 having inputs from other e-cells.

There is an excitatory synapse 105 from the output of the backward e-cell 102 to the inter e-cell 104. There is an inhibitory synapse 106 from the inter e-cell 104 to a proximal region of the forward e-cell 101 dendritic structure. The inhibitory synapse 106 is more proximal to the forward e-cell body than the regions 107 having input from other e-cells, and therefore can suppress the inputs from these other e-cells. The inter e-cell 104 provides a longer decay time constant than either of the primary e-cells.

The input region 107 of the forward e-cell generally takes many of its input from the outputs of other forward e-cells. The input region 109 of the backward e-cell generally takes many of its inputs from the outputs of other backward e-cells. The output of the forward e-cell generally makes synapses 108 on the input regions of other forward e-cells. The output of the backward e-cell generally makes synapses 110 on the input regions of other backward e-cells.

The expression of this standard module in particular circuits is specialized by variations in connection strength between the pair members, and in some cases deletion of one of the cross connections: either 103, or 105, 104 and 106.

The e-cell pair (including the inter e-cell) as a basic unit is repeated to form a group or stage. The forward e-cell outputs or axons of a given group synapse on the dendritic regions of one or many forward e-cells of downstream groups. The backward e-cell outputs or axons of a given group synapse on the dendritic regions of one or many backward e-cells of upstream groups. (Upstream and downstream are defined relative to the forward path.)

Figure 9:
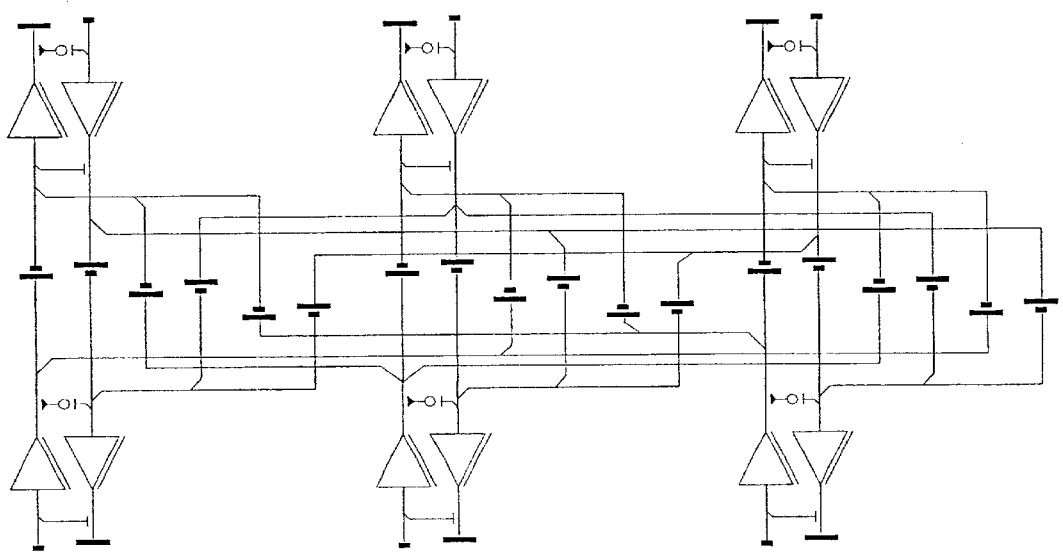
FIG. 9 shows two groups of e-cell pairs, each constituting a stage, fully interconnected.

FIG. 9 illustrates two stages fully interconnected. This figure makes evident the problem of rendering connection between stages. Henceforth, large multi-stage circuits will be rendered in a format which orthogonalizes the inputs and outputs of successive stages and thus makes the interconnection patterns more readable. Any arborization, or tree structure, specified in the dcf of an e-cell is assumed to be specified elsewhere than in the circuit diagram and all input regions for a single e-cell are simply shown connected by line segments without any suggestion of the real structure between them.

E-circuit oscillatory dynamics

Clearly, an e-cell pair has the potential of acting as an oscillator if its forward to backward excitatory connection 103 (for the i-th e-cell pair denoted $$F_i \rightarrow B_i$$

is sufficiently strong and its forward cell is driven by a sustained signal applied distal (further away from the cell body) to the backward to forward inhibitory connection 106 (the entire path 105, 104, 106 denoted.

$$F_i \xleftarrow{inh} B_i).$$

The frequency of oscillation is governed by the strength of the driving signal, the gains and propagation time around the loop and the decay time of the inhibitory signal (via the inter-e-cell) shunting the driving signal to $F_1$.

Figure 10:
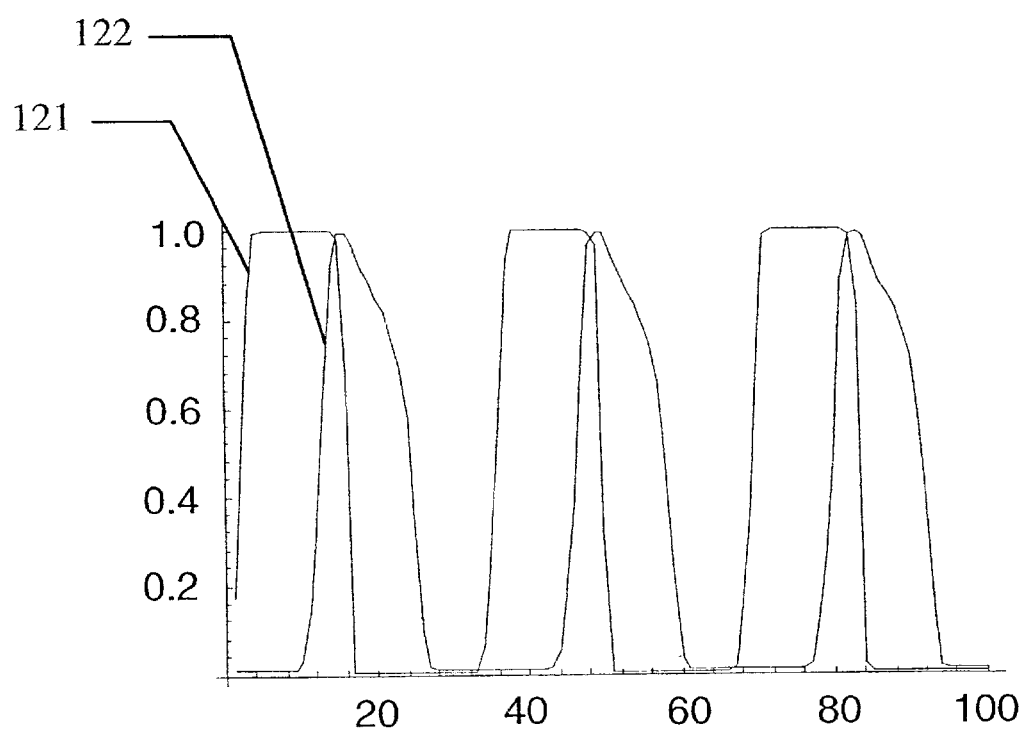
FIG. 10 shows the oscillatory activity of a single e-cell pair in a short totem. The square topped pulse is the output of the forward e-cell, the following pulse is the output of the backward e-cell.

FIG. 10 shows the activity of a single e-cell pair in oscillation. The leading pulse 121 of each pair is the forward e-cell output. The relative timing of the backward signal 122 and the trailing edge of the forward signal 121 clearly illustrate the mechanics of the oscillation. The forward signal induces the backward pulse through the $$F_i \rightarrow B_i$$

connection, and then the rise of the backward pulse cuts off the duration of the forward signal through the inhibitory $$F_i \xleftarrow{inh} B_i$$

connection. Once the backward pulse dies off, the driving excitation of $F_1$ starts the cycle over again.

Similarly a series of e-cell pair stages, termed a totem, may either behave as a single oscillator, or as a series of coupled oscillators, or as an oscillator and one or more driven stages, depending on the weights of their interconnecting synapses. The number of stages entrained as a single oscillator affects the frequency and pattern of the oscillation in a straightforward manner.

Figure 11:
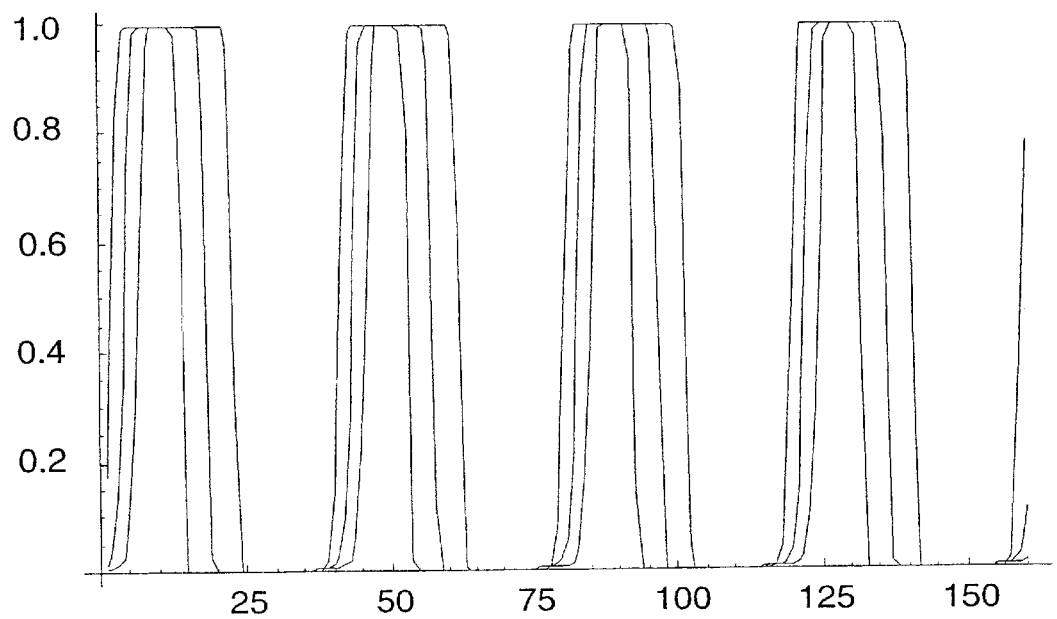
FIG. 11 shows the oscillatory activity of all the forward e-cells in a three stage totem. The propagation delay is evident.
Figure 12:
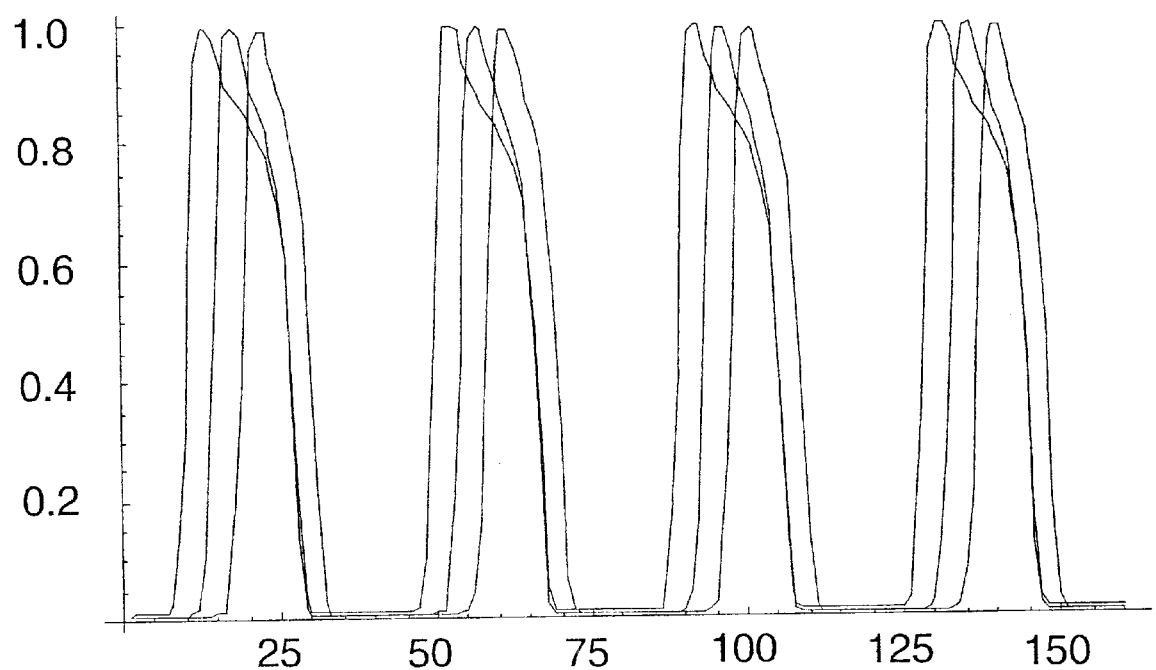
FIG. 12 shows the corresponding activity of all the backward e-cells in the three-stage totem of FIG. 13.

FIGS. 11 and 12 show the forward and backward e-cell activity respectively of each stage of a three-stage totem in oscillation. The propagation lags between the stages are clearly evident in both recordings.

Dynamic Configuration of Oscillatory Coupling

Figure 13:
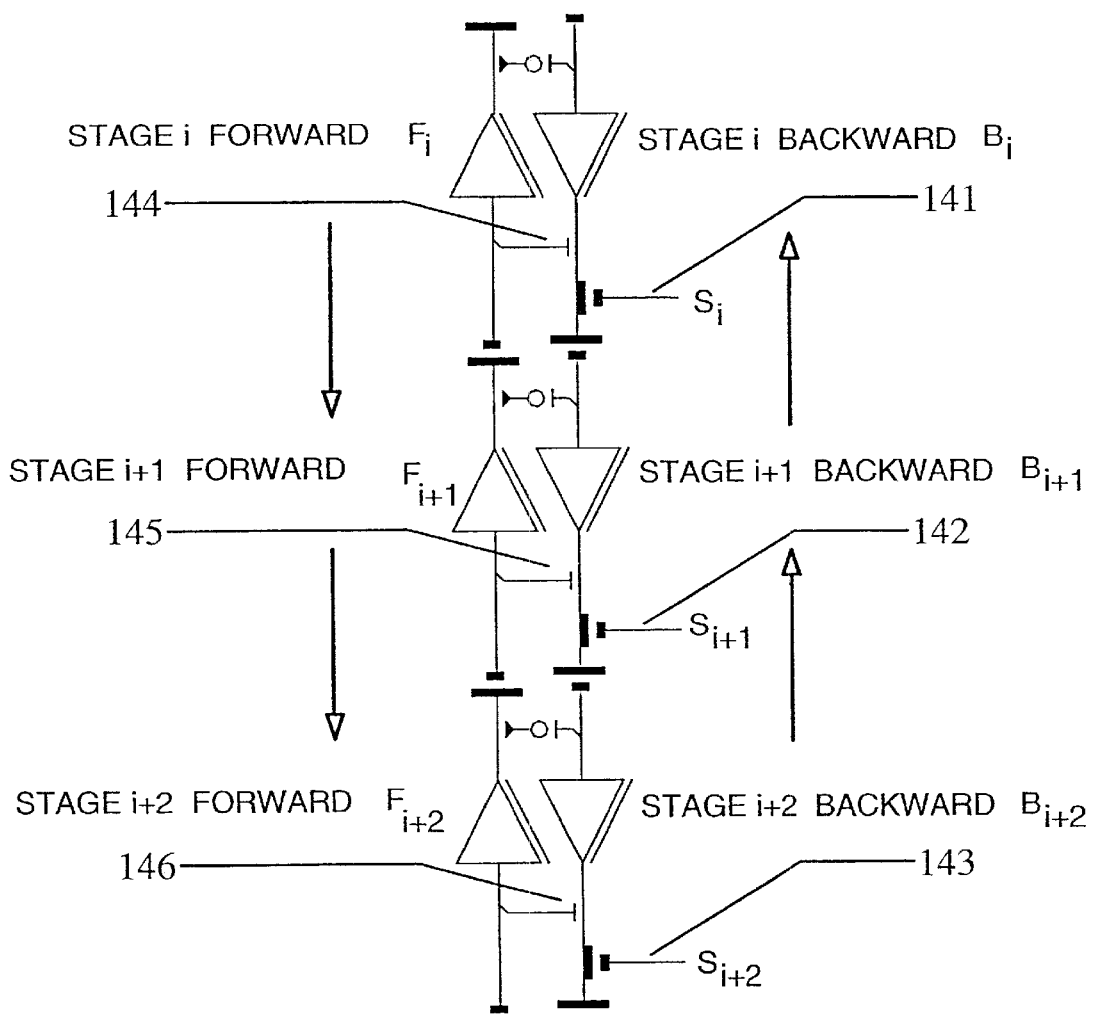
FIG. 13 shows a three stage totem with control inputs to each of the backward e-cells.

FIG. 13 illustrates a stage totem with control inputs to the backward e-cell of each stage. The number of stages in a totem entrained as a single oscillator can be altered dynamically by changing the efficacy of the $$F \xrightarrow{exci} B$$

connections of each of those stages 144, 145, 146. The simplest way to arrange this is to weaken $$F_i \xrightarrow{exci} B_i$$

for each stage so that the excitation from $F_i$ alone is insufficient to fire $B_i$, but combined with a backward path input from $B_{i+1}$ the excitation becomes sufficient to fire $B_i$. An adjacent excitatory synapse or region is provided on $B_i$ to allow an independent input $S_i$ 141, 142, 143 sufficient to allow the signal from $F_i$ to pace the firing of $B_i$ regardless of any input from $B_{i+1}$.

The independent $S_i$ inputs to all the $B_i$ now control how many stages are coupled to from a single oscillator, and these can be varied dynamically. This characteristic will turn out to be valuable in the identification of percepts under varying conditions and contexts.

Oscillation Frequency Effects

As mentioned earlier, a number of factors control the oscillation frequency of a single or multi-stage totem circuit. Most of these factors are constant in any circuit. The factors that are most likely to vary are the drives to any of the e-cells in the loop. This affects the frequency by altering the rise time of the signal, which in turn affects the rise time of the inhibition $$F_i \xleftarrow{inh} B_i.$$

The inhibitory connection of the first e-cell pair in the totem dominates the control of frequency, since it is the last stop on the backward path and thus, all time constants being equal, is the last inhibitory path to relinquish control in any cycle. Any variation in drive along the signal loop will influence its effect.

There are several common sources of such variation. One, just mentioned is any $S_i$ input to a $B_i$. Another is a $B_{i+1}$ input to $B_i$ when $B_i$ is in the last stage of the oscillatory series of the totem and $B_{i+1}$ is a driven stage. A third source of variation is an $F_i$ in the loop whose synaptic weights and dcf result in variations in output for varying afferent excitation patterns. The latter is the most important source of frequency variation in the circuits considered here.

Figure 14:
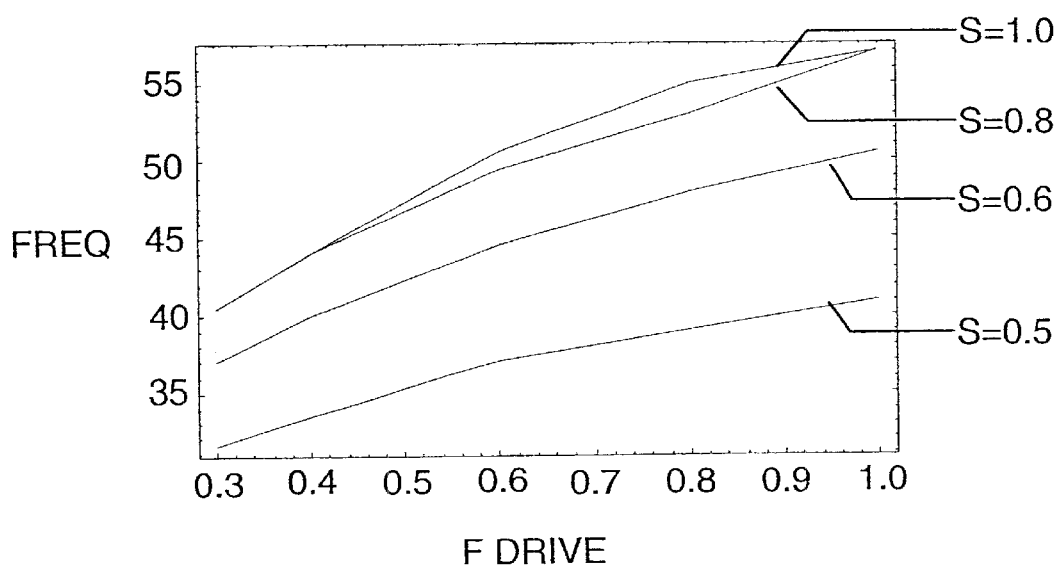
FIG. 14 shows the relationship between oscillatory frequency (y-axis) and the drive level of the input to the forward e-cell of the first stage (x-axis) of a four stage totem for 4 different values of control input S to the backward e-cell of the last stage (S=0.5, 0.6, 0.6, 1.0). This illustrates the monotonicity of oscillatory frequency as function of both input drive and control bias.
Figure 15:
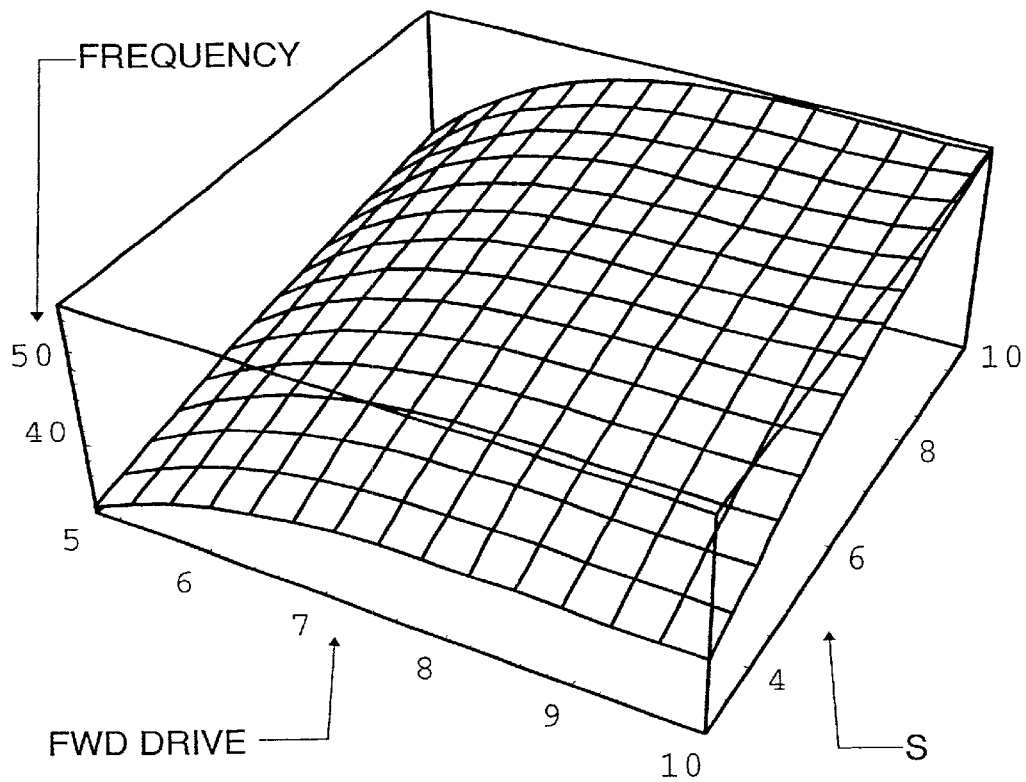
FIG. 15 shows the same data as FIG. 7 interpolated as a surface.

FIGS. 14 and 15 illustrate the frequency( y-axis) of a four stage totem for variations in input drive to the forward e-cell of the first stage (x-axis) and control bias applied to the backward e-cell of the last stage (S=0.5, 0.6, 0.8, 1.0 in FIG. 14, interpolated in FIG. 15). The monotonic relationship of frequency to $<F_i,S_1>$ is important to the computational behavior of the circuits to be derived from the standard totem. Variations in the number of coupled stages shift the surface vertically but do not affect the monotonicity.

Basic Memory Circuit

A standard two stage totem is specialized to form the memory system which will be used in subsequently presented e-circuits in this and an associated application. The organization and dynamics of this circuit drive the later extensions so they must be considered in some detail. As mentioned sequential stages are henceforth rendered at right angles to clarify the connections between the two stages. The arborization of the dcf is left implicit: each region is rendered as a thickened section on a single line which represents the dendritic structure.

Organization of the Basic Memory Circuit

Figure 16:
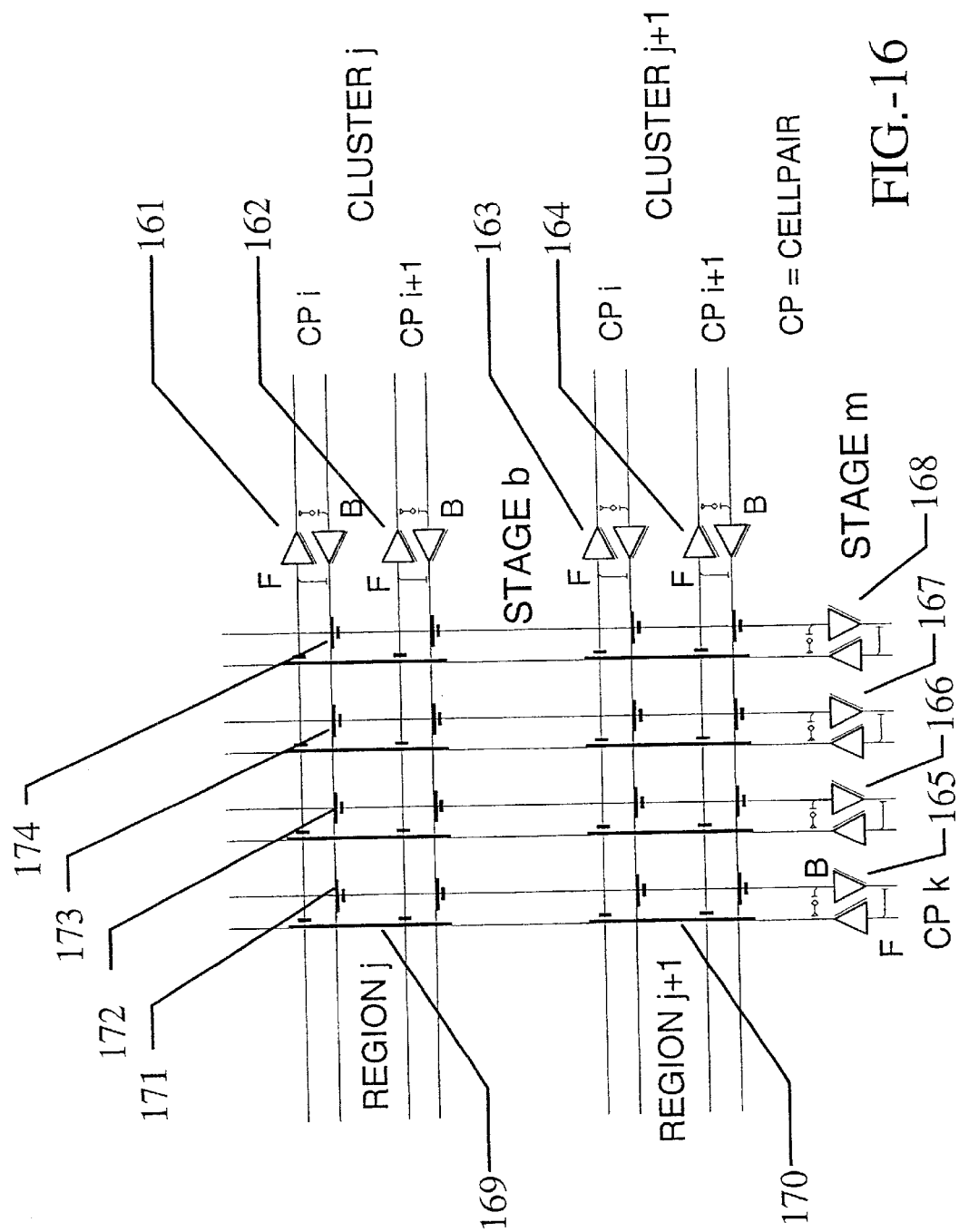
FIG. 16 shows the two stage totem specialized as a basic memory circuit. Stage b is organized in clusters corresponding to the dimensions or individual features of the input pattern. Each cluster typically encodes a feature or small set of features. Stage m contains the e-cells in which the input patterns are captured.

FIG. 16 illustrates the basic two stage memory circuit. It is frequently necessary to substructure the e-cell group that comprises a stage: the finer partitions are termed clusters.

The upstream stage, b, of the totem consists of a group of $k_b$ e-cell pairs structured as $p_b$ clusters of $q_b$ standard e-cell pairs 161, 162, 163, 164.

The downstream stage, m, of the totem consists of a group of $k_m$ standard e-cell pairs 165, 166, 167, 168 in a single cluster.

The stage m forward $F_m$ e-cells have $p_b$ excitatory regions of $q_b$ synapses 169, 170 (in addition to the synapses intrinsic to the cell-pair interconnections). The dcf combines the $p_b$ regions adjunctively through a balanced binary tree which is then combined additively with the intrinsic inhibitory connection.

The stage b backward $B_b$ e-cells have $k_m$ excitatory regions of a single synapse 171, 172, 173, 174 (in addition to the synapses intrinsic to the cell-pair interconnections).. The dcf combines the $k_m$ regions additively through either a linear or balanced binary tree which is then combined additively with the intrinsic inhibitory connection.

For the moment the stage m backward $B_m$ and stage b forward $F_b$ e-cells are extended by a single excitatory region of a single synapse additively combined with the standard totem interconnections.

The cmf for the forward path from group b to group m maps the output of the i-th e-cell of the j-th $F_b$ cluster to the ith synapse of the j-th extended region of every $F_m$ e-cell (where i=1 ... $q_b$, j=1 ... $p_b$).

The cmf for the backward path from group m to group b maps the output of the i-th e-cell of $B_m$ to the single synapse of the i-th extended region of every $B_b$ e-cell.

Initially all synapse weights in the extended regions are zero, and the standard interconnection weights are set so that both stages will be entrained as an oscillator: that is to say, $F_b \rightarrow B_b$ is insufficient to allow oscillation of the b stage alone.

The adjunctive tree of dcf of $F_m$ has the computational consequence that any region of zero or near zero w·v will veto the excitation of all the other regions (unless the tree is internally biased into the additive regime (AR), as described earlier).

On the other hand, the additive tree of the dcf of $B_b$ allows excitation from any region to propagate to the root of the tree. (In practice this dcf also limits the total tree excitation by saturation.)

Behavior of the Basic Memory Circuit

A particular e-cell or set of e-cells is instructed to memorize a pattern by raising the excitation at the root of its tree past some high threshold. In simulation this is accomplished by adding a synapse to the proximal region which is preset to a very high w. A signal applied to this synapse automatically raises the root excitation over learning threshold, and this serves as the trigger to apply one of the learning algorithms described earlier.

In the two stage memory circuit, learning of a new pattern takes place in two sets of e-cells: $F_m$ and $B_b$. The incident pattern of excitation is applied across the extra excitatory synapses of $F_b$, which apply the same pattern across the regions of all the e-cells of $F_m$. Assume the pattern applied does not match any of the patterns stored in the synaptic weights of any $F_m$ e-cell. No $F_m$ e-cell responds, and therefore there is no excitation of $B_m$, and therefore no $B_b$ e-cells respond (since $F_b \rightarrow B_b$ is insufficient, as mentioned earlier). As a result, the driving signal pattern applied to $F_b$ is not interrupted by $$F_b \xleftarrow{inh} B_b$$

and no oscillation takes place in the two stage circuit. This condition gates the signal for learning. One or more $F_b$ e-cells is instructed to learn by a signal which drives the root above learning threshold, as described above. Assuming learning is episodic, the synaptic weights of the selected $F_b$ e-cells take on the applied pattern. Meanwhile the signal that has enabled learning has also driven the e-cell or e-cells to respond and consequently the paired $B_m$ e-cell of each is driven to respond. These in turn apply excitation to the region to which each is mapped in each of the $B_b$ e-cells. At the same time, all the $B_b$ e-cells are being subjected to a learning signal that is just below threshold. The learning signal, combined with excitation via $$F_b \rightarrow B_b.$$

puts those $B_b$ e-cells which are paired with excited $F_b$ e-cells in a state to capture any excitation applied to their learning regions by $B_m$. The learning protocol for $B_b$ e-cells makes only regions with inputs subject to learning. The result is that only regions excited by the responding $B_m$ e-cells in only those $B_b$ e-cells paired with active $F_b$ e-cells are trained. Now the backward paths paired with the active forward paths become active, and the memory circuit is set into oscillation, thus completing the learning phase.

Subsequently, if a pattern matching the synaptic weights of one or more of the $F_m$ e-cells, the response will excite the paired $B_m$ e-cell or e-cells. These, in turn, will excite those $B_b$ e-cells for which the initial learning set up strong synapses, and the recognized forward pattern will be imposed on the backward path, causing the memory circuit to oscillate. As discussed earlier, the frequency of oscillation will be affected by how well the input pattern matches the pattern stored in the synaptic weights of the responding $F_m$ e-cells. In the basic memory circuit, the output is produced by the stage-m forward e-cells.

E-cell Activity in the Basic Memory Circuit

Figure 18:
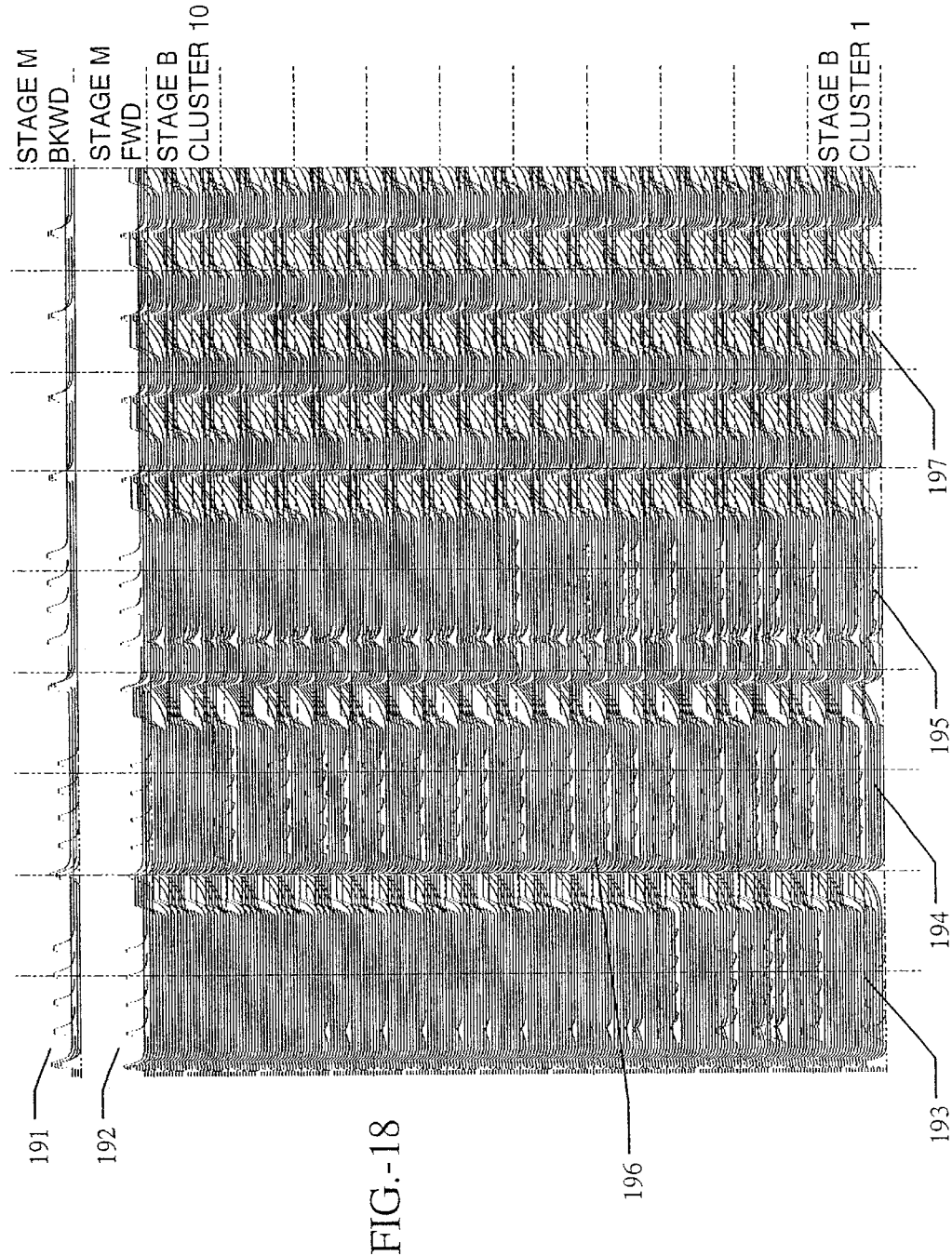
FIG. 18 shows the activity of stage m forward and backward e-cells (top two divisions) and stage b forward e-cells (lower 10 divisions) of the basic memory circuit. The basic memory circuit here is part of a larger circuit performing input field segmentation and attentional shifts.

FIG. 18 illustrates the activity of stage m and stage b of a basic memory circuit (part of a larger circuit which performs the input field segmentation and attention shifts shown) during a sequence of attention shifts to different input subfields. The top two divisions of data show the activity of four stage m forward 192 and backward 191 e-cells respectively (memory e-cell pairs) responding in succession to different input patterns. The lower ten divisions of data show the activity of stage b forward e-cells carrying input patterns to the memory e-cells from a sequence of different locations on the input field e-cell array (input field activity data not shown). In the lower ten divisions each vertical division corresponds to one stage b cluster. (The baseline of each trace starts within the division for its cluster, though the rise may carry the trace out of its cluster boundary.)

Close inspection reveals the large array of e-cells settling into three successive distinct patterns of activation at a frequency of about 4 cycles per division 193, 194, 195. These patterns successively elicit synchronized response from three different memory cells which have been trained to those patterns earlier. The recognition oscillations here terminate after a number of cycles due to the action of attention shift circuitry on earlier stages (not illustrated) which suppress a recognized input subfield after a certain amount of oscillatory activity. The memory e-cells all have 10 regions of 24 inputs or synapses each, but have all been trained with patterns having inputs on fewer than 10 regions. The null regions effectively drop out of the pattern evaluation thus allowing the memory e-cells to respond selectively to inputs of widely varying dimension.

The oscillatory behavior arises from the feedback of signal along descending or backward paths from memory to the input field. The oscillatory time constants are determined by the e-cell decay constants, the strength of coupling between e-cells and the number of e-cells in the feedback loop.

Close inspection of the patterns of fast oscillatory activity on the stage b forward e-cells also reveals a variation in rise times among those signals belonging to a single target input pattern, particularly on the first cycle 196, before the response synchronizes the oscillation. These variations in rise time reflect a variation in activation in the components of the input signal. Since these components all contribute to the activation of the stage m forward e-cells, these variations in rise time also affect the rise times of the responses of the stage m e-cells in proportion to the weight of the synapses driven by each component. Thus, even though the components all reach maximum activation, the rate at which they do reach that maximum are critical to the competition amongst the responding stage m e-cell pairs. This dynamic is further discussed in an associated application General Purpose Recognition E-Circuits Capable of Translation-Tolerant Recognition, Scene Segmentation and Attention Shift, and Their Application to Machine Vision).

The burst of non-selective activity between the patterns and after recognition of the three input patterns 197 has completed arises due to distractor patterns in the input field composed of elements of the target patterns. These are capable of evoking a transient response from memory e-cells but are incapable of sustaining the oscillatory response which signals successful recognition.

Variable Strictness Percept Matching in the Basic Memory Circuit

The circuit as develop so far can be used as the basis of a circuit which is capable of identifying subsets of memorized percepts. The mechanism to implement this depends on the characteristic of the stage m e-cell. which allows continuum of its recognition behavior over the full range of the adjunctions from MR to AR. It should be recalled that bias may be applied to push the dcf adjunctions into the additive regime and thereby relax the stringency for the presence of matching input to all the regions. This characteristic can be used to elicit the largest intersecting subset between an input feature set and a number of memorized percepts by gradually increasing the bias to the percept memory regions until a response is evoked. Even if multiple responses are evoked at a given bias level, periodicity competition will usually sort out a winner.

Figure 19:
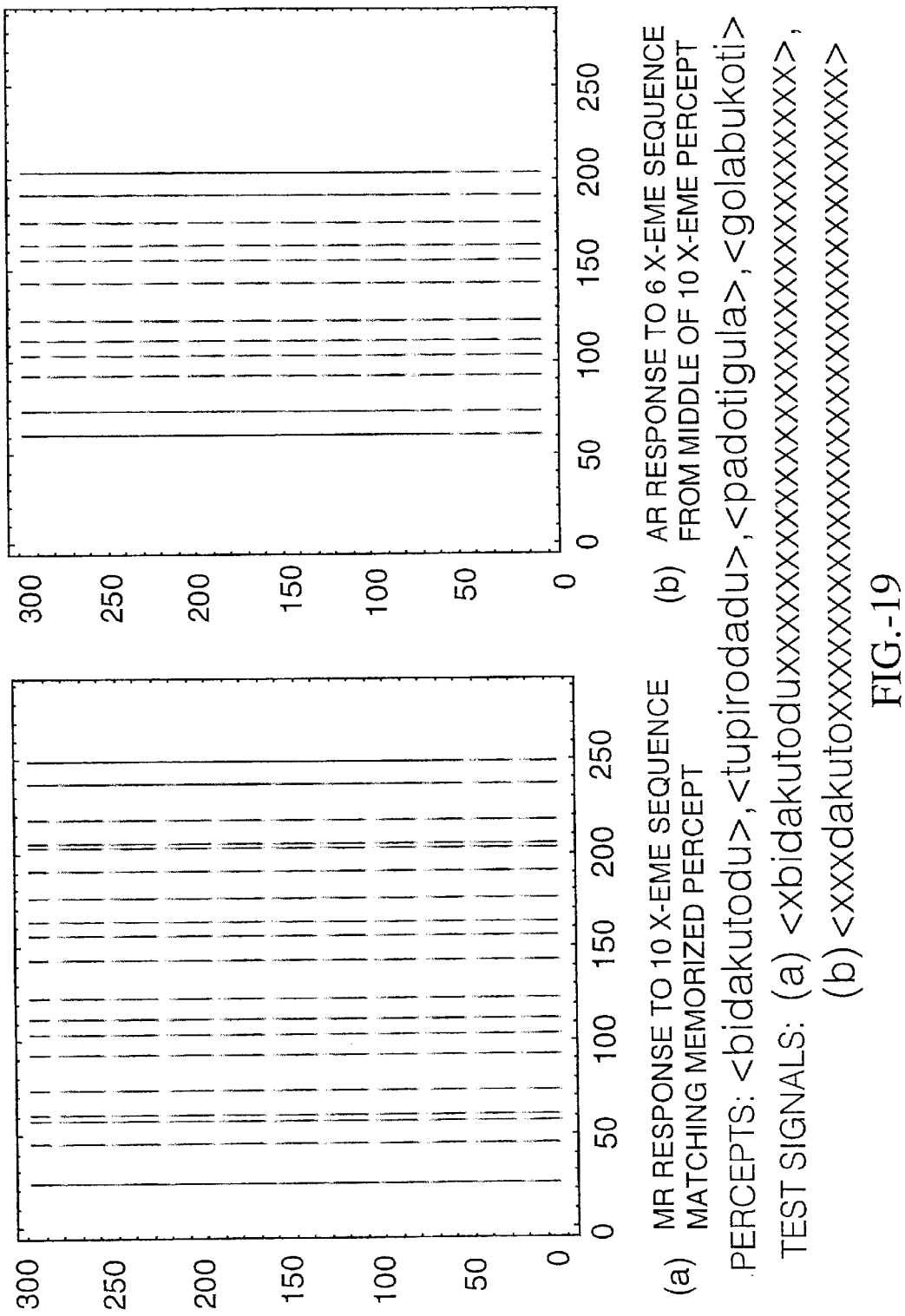
FIG. 19 shows a density plot of the activity of stage r backward e-cells of an r-b-m e-circuit responding in MR (a) to a 10 x-eme input sequence matching a previously memorized percept, and responding in AR (b) to a 6 x-eme input sequence matching only the middle six x-emes of a previously memorized percept. (Note: an x-eme is the basic component of an abstract percept, corresponding to a phoneme in spoken language.)

FIG. 19 panel (a) illustrates stage r forward activity during a stage m MR response to a 10 x-eme input matching a 10 x-eme percept. (Note: an x-eme is the basic component of an abstract percept, corresponding to a phoneme in spoken language.) FIG. 19 panel (b) illustrates stage r forward activity during a stage m AR response to a 6 x-eme input partially matching a 10 x-eme percept. The bias to stage r forward memory e-cells is 0.0 for the MR match and 0.65 for the AR match. FIG. 7 shows the response of the stage m e-cell containing the 10 x-eme percept when presented with the 6 x-eme subset as the bias is raised incrementally from 0.0 to 0.7 where it remains once stable high-frequency oscillatory response is established.

Basic Memory Circuit with Context and Association

Extending the basic memory circuit by a single stage, c, provides the most direct implementation of contextual modulation of stage m responses. Contextual memory resides downstream from percept memory, with its primary inputs from $F_m$ and with secondary associative and control inputs to $B_c$.

Context Circuit Extension Organization

Figure 17:
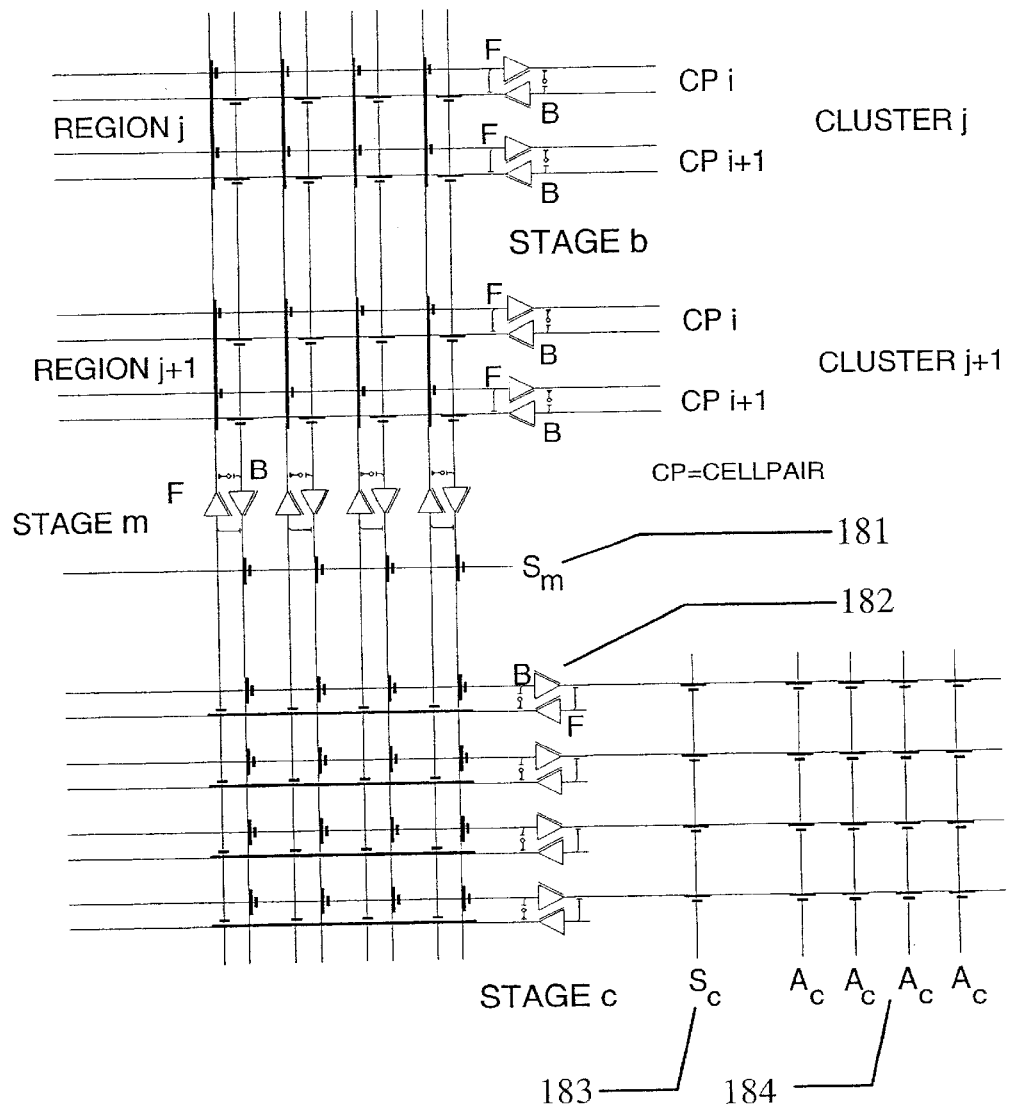
FIG. 17 shows the basic memory circuit extended by another memory stage which stores context and provides encoded association paths to other circuits.

FIG. 17 illustrates the basic two stage memory with context extension and association inputs. The basic memory circuit is modified to allow dynamic control of the oscillatory loop by an external control signal 181 ($S_m \rightarrow B_m$), as described earlier in the section on standard totem dynamics. $S_m$ 181 determines whether percept memory responds independently or under the influence of context memory. If $S_m$ 181 is active, $S_c$ 183 is irrelevant.

As shown, stage c influences the upstream stages via the backward path: it can do so only if one or more of its own $B_c$ 182 e-cells is made active by a combination of a responding $F_c$ e-cell and either a control input $S_c$ 183 or an associative input $A_c$ 184.

Specification of E-cells

Regardless of the technology of embodiment of e-cells the configurations of all e-cells in a circuit are amenable to formal specification, as are all aspects of circuits built with e-cells. While the equations suggest an infinite choice for the values of parameters, in practice a very limited repertoire of parameters allows enough variety to build working circuits. In practical e-circuits e-cells fulfill one of a limited number of standard roles. The parameters that control the e-cell dynamics are constant for a given role. These role defined parameter sets are selected by an index in the specification. For different technologies of implementation the particular constants in each role set are necessarily different, but the same role index selects the correct set for a given role. This permits the use of a given specification across different technologies of implementation by substituting tables, and minimizes the cost of moving from simulation to hardware, both in terms of effort and risk.

E-cells (and e-circuits) can be specified by a number of formal descriptions, textual and graphic. The syntax (defined in an extended form of BNF) for an e-cell specification is extracted from the complete e-circuit specification BNF:

```
dtconfig:
[
        dtconfigs < dt_config_ct >
        [
                <config_idx, cellfunc_idx, region_ct, region_spec_ct,
                trainable_flag, dtspec_ct >
                [
                        < region_idx_lb, region_idx_ub, region_type,
                        syn_ct >
                ] * dtconfig:region_spec_ct ^
        [
                        <dt_combining_code, src_regionnode_lb,
src_regionnode_ub, dest_node>
                ] * dtconfig:dtspec_ct ^
        ] * dtconfig:dt_config_ct
        end dt_configs
]
```

Some of the parameters in the specification are meta-data concerning the specification itself. The parameters which determine the configuration of the e-cell are:

cellfunc_idx specifies one of a small number of parameter sets for equation (i). The use of table driven parameters for the parameters which control e-cell dynamics allows the same specification to be used for implementation in different technologies by substituting different tables which implement equivalent e-cell role types for the same cellfunc_idx.

region_ct specifies the number of regions in the e-cell trainable_flag specifies whether any regions in the e-cell are trainable <region_idx_lb, region_idx_ub, region_type, syn_ct> specifies for a homogeneous set of regions its upper and lower index, its type (inhibitory, excitatory fixed, excitatory training, etc), and the number of synapses or inputs to each region. There must be sufficient number of these tuples to specify the full count of regions in the e-cell.

<dt_combining_code , src_regionnode_lb, src_ regionnode_ub, dest_node> the node function type for a range of input regions or nodes and the node index of the node function output. There must be sufficient number of these tuples to fully specify the entire dcf tree for the e-cell. The syntax allows a single statement to designate the inputs to a single node, or (in the interest of terseness) structure a contiguous range of input nodes or regions in a balanced tree with a single specified output node.

Specification of E-circuits

Practical e-circuits contain tens of thousands to millions of e-cells with dense interconnections between them. Specification of such circuits e-cell by e-cell is of course impractical and error prone. The basic circuits which constitute the invention make it possible to specify e-circuits at a much higher level. By formalizing the specification of entire circuits, a realization in one implementation technology may be translated into another implementation technology with a minimum of re-engineering. The formal specification of a circuit currently compiles into the data structures that directly drive software simulation of the entire e-circuit with no further programming. The same specification is equally capable of being compiled into a set of specifications for hardware realization.

E-circuits and e-cells can be specified by a number of formal descriptions, textual and graphic. The complete syntax of a specification language for e-circuits, including e-cells as described in associated application, follows:

---

Circuit Description Syntax

---

```
note: _idx, _ct, _sz, _xord, _lb, _ub --> integer
      _flag --> logical
      _val --> real
[
        descriptor
] * name:x --> x descriptors in vertical order ,indentation for clarity only
name:x ^ means most recent x in "name:" scope (to resolve ambiguity of
multiply occurring entities).
< (element,) * m > --> m comma separated elements on a line
-------circuit descriptor file syntax-------------------
circuit:
[
        < version_string >
        < max_assoc_ct, est_region_ct >
        < estimated_dtexecarr_sz >
]
group:
[
        groups < group_ct >
        [
                < class, cell_ct, assoc_size >
                < (dt_config_idx,) * group:assoc_size >
        ] * group:group_ct
        end_groups
]
dtconfig:
[
        dtconfigs < dt_config_ct >
        [
                < config_idx, cellfunc_idx, region_ct,
region_spec_ct, trainable_flag, dtspec_ct >
                [
                        < region_idx_lb, region_idx_ub,
                        region_type, syn_ct >
                ] * dtconfig:region_spec_ct ^
                [
                        < dt_combining_code, src_region_lb,
                        src_region_ub, dest_region >
                ] * dtconfig:dtspec_ct ^
        ] * dtconfig:dt_config_ct
        end dt_configs
]
clusterset:
[
        clustersets < clusterset_ct >
        [
                < clusterset_idx, group_idx, clus_sz, clus_ct,
                stride_ct >
        ] * clusterset:clusterset_ct
        end_clustersets
]
connection_map:
[
        connectionmaps < connection_map_ct >
        [
                cmap < cmap_no >
                dt:
                < dt_cluster_set_idx >
                < dt_clus_xord, dt_clus_lb, dt_clus_ub >
                < dt_assoc_xord, dt_assoc_lb, dt_assoc_ub >
                < dt_assoc_member_idx >
                < dt_region_xord, dt_region_lb,
                dt_region_ub >
                < dt_syn_xord, dt_syn_lb, dt_syn_ub >
                        < dt_syn_wgt_init_val [,delwgt1,
delwgt2, delwgt3, delwgt4] > / (*note: "/" required *)
                axon:
                < axon_cluster_set_idx >
                < axon_clus_xord, axon_clus_lb, axon_clus_ub
[,radius_lb, radius_ub, diagdir] >
                < axon_assoc_xord, axon_assoc_lb,
axon_assoc_ub [,radius_lb, radius_ub, diagdir]
```

---

-continued

Circuit Description Syntax

---

```
[,<terrsign, terrheight, terrwidth>] >
                < axon_assoc_member_idx >
                < axon_repeat_ct >
        ] * connection_map:connection_map_ct
        end_connectionmaps
]
driver_init_map:
[
        driverinitmaps < driver_init_map_ct >
        [
                < axon_cluster_set_idx >
                < axon_clus_lb, axon_clus_ub >
                < axon_assoc_lb, axon_assoc_ub >
                < axon_assoc_member_idx >
                < driverinitvalarr_idx >
        ] * connection_map:connection_map_ct
        < driverinitvalarr_sz >
        [
                < init_val >
        ] * driver_init_map:driverinitvalarr_sz
        end_driverinitmaps
]
driver_init_vals:
[
        driverinitvals < driver_init_spec_ct, drvinit_valarr_sz >
        [
                < init_valarr_idx_lb, init_valarr_idx_ub ,
                value >
        ] * driver_init_vals:driver_init_spec_ct
        < initdimension >+           */ test specific parameters */
        end_driverinitvals
]
data_capture_spec:
[
        datacapspec < spec_count, capture_points, iterations >
        [
                < clusterset_idx, clus_idx, assoc_lb, assoc_ub,
assoc_member_idx >
        ] * data_capture_spec:spec_count
        end_datacapspecs
]
note: capture_points conforms with (assoc_ub - assoc_lb)
```

---

The important aspects of the specification language correspond to structures and mappings described in the text. Briefly, A circuit consists of a set of e-cell groups, usually each comprising a stage, with the parameters class defines a general type for the group cell_ct how many e-cells in the group assoc_size how many e-cells are in an "association". For example a standard e-cell "pair" is a triplet of forward, backward and inhibitory, hence assoc_size 3 dt_config_idx is the index of the configuration information for each e-cell in the association The dtconfigs define the configurations of each kind of e-cell. This is discussed in the description of the e-cell.

E-cell groups are subdivided in clustersets, individually referred to as clusters, with the parameters clus_sz how many e-cell associations in each cluster clus_ct how many clusters in the group stride_ct the stride of the cluster index, i.e. if clusters of subsequent index are not contiguous in the group Note that a group can be addressed as more than one clusterset. The clusterset is the basis of connection mapping, and in different parts of the connection map the same group may be differently divided.

The connectionmap defines a set of connections, cmaps, between destination clusterset e-cell dt (dendritic tree) region/synapse terminals and source clusterset e-cell axon.

The individual emaps allow a set of equivalent connections between individual e-cells in two clustersets to be defined in one statement. Ranges in region and synapse specs including radius bounds and diagonal direction allow complex connection patterns such as the diagonal sampling for r-match to be specified. Weight gradients can also be specified.

Driver (pseudo e-cell) connections, the external control of the test conditions, and the arrangement of the activity recording data are specified by driverinitmaps, driverinitvals, and datacapspecs.

Note that some of the specification is meta-data concerned with the organization and consistency of the specification itself.

What is claimed is:

1. An e-cell pair, comprising:

a forward e-cell having a forward e-cell input region, a forward e-cell cell body, a forward e-cell inhibitory synapse, and a forward e-cell output;

a backward e-cell having a backward e-cell input region, a backward e-cell cell body, and a backward e-cell output; and an inter e-cell having an inter e-cell excitatory synapse and an inter e-cell output;

wherein the inter e-cell output is coupled to the forward e-cell inhibitory synapse, and the backward e-cell output is coupled to the inter e-cell excitatory synapse.

2. An e-cell pair as in claim 1, wherein the backwarde-cell further has a backward e-cell excitatory synapse, and the forward e-cell output is coupled to the backward e-cell excitatory synapse.

3. An e-cell pair totem, comprising:

a first e-cell pair having a first forward e-cell input region, a first forward e-cell output, a first backward e-cell input region, and a first backward e-cell output; and a second e-cell pair having a second forward e-cell input region, a second forward e-cell output, a second backward e-cell input region, and a second backward e-cell output;

wherein the first forward e-cell output is coupled to a forward synapse within the second forward e-cell input region, and the second backward e-cell output is coupled to a backward synapse within the first backward e-cell input region.

4. An e-cell pair totem as in claim 3, wherein the first e-cell pair further has a first control input, and the second e-cell pair further has a second control input.

5. An e-cell circuit, comprising:

a first plurality of first e-cell pairs each having a first forward e-cell input region, a first forward e-cell output, a first backward e-cell input dendritic tree structure, and a first backward e-cell output;

a second plurality of second e-cell pairs each having a second forward e-cell input dendritic tree structure, a second forward e-cell output, a second backward e-cell input region, and a second backward e-cell output; and wherein the second forward e-cell input dendritic tree structures each include one or more forward synapses coupled to one of the first forward e-cell outputs, and the first backward e-cell input dendritic tree structures each include one or more backward synapses coupled to one of the second backward e-cell outputs.

6. A e-cell circuit as in claim 5, wherein each of the second forward e-cell input dendritic tree structures and the first backward e-cell input dendritic tree structures includes at least one dendritic combining node.

7. A memory circuit, comprising:

a stage b stage having $k_b$ stage-b e-cell pairs, each stage-b e-cell pair having a stage b forward input, a stage b forward output, and $k_m$ stage-b backward input synapses; and a stage-m stage having $k_m$ stage-m e-cell pairs, each stage-m e-cell pair having $k_b$ stage-m forward input synapses and a stage-m backward output;

wherein each of the $k_b$ stage-b forward outputs is coupled to a corresponding stage-m one of the $k_b$ stage-m forward input synapses, and each of the $k_m$ stage-m outputs is coupled to a corresponding stage-b one of the $k_m$ stage-b backward input synapses.

8. A memory circuit as in claim 7, wherein the stage-b stage comprises $p_b$ clusters of $q_b$ e-cell pairs; and wherein each stage-m e-cell pair has a stage-m dendritic input tree having $p_b$ regions each having a corresponding $q_b$ of the $k_b$ stage-m forward input synapses.

9. A memory circuit as in claim 7, wherein each of the $k_m$ stage-in forward e-cell pairs further has a stage-m learning synapse, and each of the $k_b$ stage-b backward e-cell pairs further has a stage b learning synapse.

10. A memory circuit as in claim 9, wherein each of the $k_m$ stage-m learning synapses belongs to a region of a stage-m dendritic input tree, and wherein each of the $k_b$ stage-b learning synapses belongs to a region of a stage b dendritic input tree.

* * * * *